United States Patent
Korshikov et al.

(10) Patent No.: US 11,602,896 B2
(45) Date of Patent: *Mar. 14, 2023

(54) 3D PRINTING OF A COMPOSITE MATERIAL VIA SEQUENTIAL DUAL-CURING POLYMERIZATION

(71) Applicant: Mighty Buildings, Inc., San Francisco, CA (US)

(72) Inventors: Vasily Korshikov, Tomsk (RU); Anna Trushina, Tomsk (RU); Dmitrii Starodubtsev, Tomsk (RU); Slava Solonitsyn, Mountain View, CA (US); Igor Kovalev, Tomsk (RU); Anna Ivanova, Tomsk (RU); Aleksei Dubov, Moscow (RU)

(73) Assignee: Mighty Buildings, Inc., San Francisco, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/541,081

(22) Filed: Aug. 14, 2019

(65) Prior Publication Data

US 2021/0046706 A1  Feb. 18, 2021

(51) Int. Cl.
*B29C 64/106* (2017.01)
*B29C 64/314* (2017.01)
(Continued)

(52) U.S. Cl.
CPC .......... *B29C 64/314* (2017.08); *B29C 64/106* (2017.08); *B29C 64/209* (2017.08);
(Continued)

(58) Field of Classification Search
CPC ................ B29C 64/106; B29C 64/386; B29C 64/393; B29C 64/209; B33Y 70/00; B33Y 70/10;
(Continued)

(56) References Cited

U.S. PATENT DOCUMENTS

| 4,159,301 | A | 6/1979 | Buser et al. |
| 5,274,029 | A * | 12/1993 | Kelley ................. C08F 279/04 525/316 |
| 6,126,523 | A | 10/2000 | Moriyasu et al. |
| 10,471,655 | B2 * | 11/2019 | Menyo ............... C08G 73/0655 |
| 2009/0118444 | A1 * | 5/2009 | Woike ..................... C08F 14/06 422/138 |

(Continued)

FOREIGN PATENT DOCUMENTS

WO 2017/040883 A1 3/2017
WO 2017/112521 A1 6/2017
(Continued)

OTHER PUBLICATIONS

M. Retailleau et al., "Dual-cure photochemical/thermal polymerization of acrylates: a photoassisted process at low light intensity," Polymer Chemistry 5, 6503 (2014).
(Continued)

*Primary Examiner* — Joseph S Del Sole
*Assistant Examiner* — Margaret B Hayes
(74) *Attorney, Agent, or Firm* — Cognition IP, P.C.; Edward Steakley; Justin White

(57) ABSTRACT

A method of printing a 3D printing a photopolymer composite material includes providing a resin premix material including an acrylate monomer or an acrylate oligomer, an inorganic hydrate, a reinforcing filler, a co-initiator, and an ultraviolet (UV) initiator. A thermal initiator is mixed with the resin premix to form a photopolymer composite resin. The photopolymer composite resin is repeatedly extruded and dual-cured by a 3D printing system to create a photopolymer composite material. The 3D printing system includes a control system, a mixing system, a feeding system in fluid communication with the mixing system, a light
(Continued)

curing module controlled by the control system, and a printing head controlled by the control system.

19 Claims, 11 Drawing Sheets

(51) Int. Cl.
```
B29C 64/329      (2017.01)
B33Y 30/00       (2015.01)
B29C 64/393      (2017.01)
B33Y 50/02       (2015.01)
B33Y 10/00       (2015.01)
B33Y 40/10       (2020.01)
B29C 64/209      (2017.01)
B33Y 70/10       (2020.01)
B29K 105/00      (2006.01)
B29K 509/02      (2006.01)
```
(52) U.S. Cl.
CPC .......... *B29C 64/329* (2017.08); *B29C 64/393* (2017.08); *B33Y 10/00* (2014.12); *B33Y 30/00* (2014.12); *B33Y 40/10* (2020.01); *B33Y 50/02* (2014.12); *B33Y 70/10* (2020.01); *B29K 2105/0002* (2013.01); *B29K 2509/02* (2013.01)

(58) Field of Classification Search
CPC ......... B33Y 30/00; B33Y 10/00; C08F 20/32; C08F 122/1006; C08F 222/103; C08F 2/50; C08K 2003/387; C08K 2003/2227; C08K 3/38; C08K 3/20; C08K 3/013; C08K 5/5397; C08K 5/14

See application file for complete search history.

(56) References Cited

U.S. PATENT DOCUMENTS

| | | | |
|---|---|---|---|
| 2012/0251841 A1* | 10/2012 | Southwell | G03F 7/0045 522/15 |
| 2015/0321418 A1 | 11/2015 | Sterman et al. | |
| 2016/0257068 A1 | 9/2016 | Albert et al. | |
| 2017/0029653 A1* | 2/2017 | Zhao | C08F 290/067 |
| 2018/0079923 A1* | 3/2018 | Umebayashi | C09D 11/101 |
| 2019/0001571 A1* | 1/2019 | Stockett | B33Y 30/00 |
| 2019/0031545 A1* | 1/2019 | Buschmann | C12P 3/00 |
| 2019/0039299 A1* | 2/2019 | Busbee | B33Y 70/00 |
| 2010/0327493 A1* | 12/2010 | Fong | B33Y 10/00 264/401 |

FOREIGN PATENT DOCUMENTS

| | | | | |
|---|---|---|---|---|
| WO | WO-2017112521 A1 * | 6/2017 | | |
| WO | 2018/156766 A2 | 8/2018 | | |
| WO | WO-2018156766 A2 * | 8/2018 | | C08F 222/40 |

OTHER PUBLICATIONS

Bisomer PTE Product Data. Datasheet [online], GEO Specialty Chemicals, 2018. p. 2, In 1-3. Retrieved from the internet <URL: http://www.geosc.com/Assets/Files/Products-Docs/P-CProduct-Docs/Bisomer-Products/Bisomer-PTE-TDS.pdf>.

International Search Report in International Application No. PCT/2020/046039, dated Jan. 11, 2021.

* cited by examiner

3D PRINTING OF A COMPOSITE MATERIAL VIA SEQUENTIAL DUAL-CURING POLYMERIZATION

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the 3D printed articles were generally models, the industry is quickly advancing by creating 3D printed articles that may be functional parts in more complex systems, such as hinges, tools, structural elements.

In existing 3D printing processes, a 3D object is created by forming layers of material under computer control without molding. For example, 3D information of a structure is determined using computer 3D modeling fragmentation and a prepared mixture can be fed from a nozzle by mechanical control to print the structure.

One serious problem and challenge of 3D printing is that printing materials meeting requirements of certain applications can be very scarce. For example, existing printing materials are mainly organic materials. The organic materials are printed in a molten state at a high temperature via layer by layer deposition. Curing of the organic materials is prone to oxidation decomposition, and the preparation and printing processes may emit unpleasant toxic gases that harm the environment and human health. In addition, the organic materials may be printed under demanding conditions which incur high costs. Structures printed with the organic materials may have poor mechanical properties and are therefore not suitable for certain applications such as constructing livable buildings, thus limiting the application of 3D printing technology to a certain extent.

Another example of printing material is cement-based materials such as concrete. Cement-based materials generally take a long time to solidify. Thus, such materials generally cannot meet performance requirements requiring the material to rapidly solidify in a short period of time. Even though the speed of solidification can be increased by changing the formulation, such increase is usually limited or difficult to control and makes 3D printing impractical for certain circumstances such as constructing a building on a construction site.

In view of the foregoing, there is a need for improvements and/or alternative or additional solutions to improve 3D printing materials and processes.

In conventional additive or three-dimensional fabrication techniques, construction of a three-dimensional object is performed in a stepwise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. Photochemical curing, also known as photopolymerization, is an inexpensive and efficient method of additive manufacturing.

The main drawback of light-curing is the limited penetration of light radiation into the irradiated material, which gets even more limited in presence of colored, semi-transparent, or opaque additives, which are frequently used to give the material functional properties. In any known layer-by-layer printing process using polymer materials, the polymer matrix embedded with the composition of the filler must allow UV light penetration depth to be sufficient for a complete layer solidification.

The other issue related to photopolymerization is that non-uniform volume shrinkage occurs upon polymerization, which results in a high level of residual stress and detrimental warpage or curvature of the printed samples. The bulk volume shrinkage in photopolymerization is an unavoidable result of the formation of new covalent bonds via the van der Waals force. As a result, polymerization strains are introduced incrementally, layer-by-layer during 3D printing, thereby giving rise to residual stresses. If the stress exceeds the adhesive strength of any component of the system, micro- or macro-deformations occur (cracking, delamination, etc.) during and after printing.

Retailleau, Ibrahim and Allonas, Polymer Chemistry 5, 6503 (2014), describe UV-curing polymerization of acrylates assisted by a thermal polymerization, but the proposed system requires a significant time to cure at the surface. Thus, it does not fit for additive manufacturing, especially for extrusion-based additive manufacturing, and no suggestion is made on how those materials may be adapted to additive manufacturing.

Rolland, and Menio, patent application WO2017040883A1, describe dual-cure cyanate ester resin for additive manufacturing. McCall, patent application WO2017112521A1, describes dual-cure polyurethane/polyurea-containing resins for additive manufacturing. Both above-mentioned inventions describe combination of layer-by-layer photopolymerization, preferably DLP or CLIP methods, followed by thermal curing to form two interpenetrating polymer networks. This main shortcoming of this method is the need to perform additive manufacturing in two subsequent stages, which increases production time and required labor, and adds additional equipment costs.

Therefore, there is a need to develop a novel composite that will solve the above-mentioned shortcomings of the existing formulations.

BRIEF SUMMARY

This disclosure relates to a method of 3D printing a photopolymer composite material, the method comprising first providing a resin premix material including at least one of an acrylate monomer and an acrylate oligomer in the range between about 10.0-30.0 w % of a photopolymer composite resin, an inorganic hydrate in the range between about 5.0-30.0 w % of the photopolymer composite resin, a reinforcing filler in the range between about 50.0-80.0 w % of the photopolymer composite resin, an ultraviolet (UV) initiator in the range between about 0.001-0.2 w % of the photopolymer composite resin, and a co-initiator in the range between about 0.001-0.05 w % of the photopolymer composite resin. The method further comprises mixing a thermal initiator in the range between about 0.001-0.05 w % of the photopolymer composite resin with the resin premix material to form the photopolymer composite resin. The method next comprises extruding a layer of the photopolymer composite resin using a 3D printer onto a support and at least partially curing the layer using light irradiation. The method finally comprises repeating the steps of extrusion and partial curing onto each subsequent layer to create the photopolymer composite material, which may be a 3D printed part.

This disclosure further relates to a 3D printing system comprising a control system, a mixing system, a feeding system in fluid communication with the mixing system, a light curing module controlled by the control system, and a printing head controlled by the control system. The printing head includes a fluid communication with the feeding system, an extruder in fluid communication with the feeding system, a nozzle in fluid communication with the extruder, and the mixing system supplying a resin premix material generated by the method disclosed herein. The feeding system supplies a thermal initiator in the range between about 0.001-0.05 w % of the photopolymer composite resin and the resin premix material to form the photopolymer composite resin. The extruder delivers the photopolymer composite resin to the nozzle. The control system instructs the nozzle to extrude a layer of the photopolymer composite resin onto a support. The control system further instructs the light curing module to at least partially cure the layer using light irradiation. The control system controls the repetition of the extrusion and curing steps onto each subsequent layer to create a photopolymer composite material, which may be a 3D printed part.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
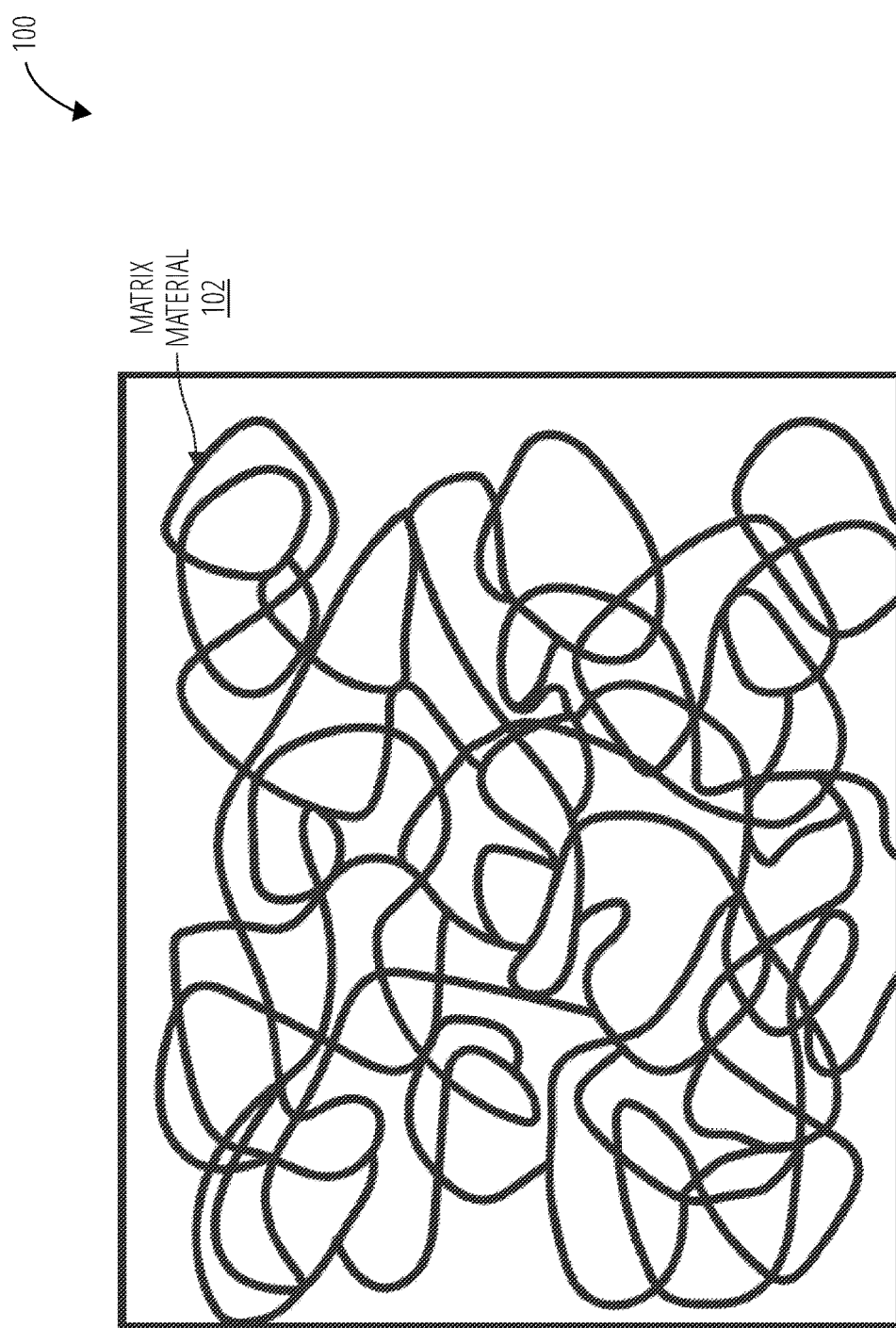
FIG. 1 illustrates end material 100 in accordance with one embodiment.

The present invention is related to a new composition that comprises of polymer matrix, inorganic fillers and a complex of polymerization initiating agents, providing a stable single-stage 3D printing process. In some embodiments, the invented composition may include a flexible variation of the printing speed and embed into the polymer matrix the mineral fillers of different nature, including semi-transparent, opaque, and colored particles.

To resolve the existing issues, the dual-cure process may be implemented by using the co-initiation system, including the use of photo initiators, thermal initiators and others. The synergistic effects of multiple initiation agents have been explored and described. The application of a dual-cure (i.e., dual-initiation) system opens opportunities for the on-demand curing of polymer materials. A composite material may combine properties of a polymer matrix and microcrystalline inorganic fillers. The material may comprise a base acrylate monomer and/or acrylate oligomer, filler composition, and a system of co-initiating agents of photo- and thermal-polymerization, which may induce a dual-cure reaction of the monomer/oligomer ensure a stable printing process.

A photopolymer composite material combines properties of a polymer matrix and microcrystalline inorganic fillers. The material comprises a base acrylate monomer, filler composition and system of co-initiating agents of photo and thermal-polymerization which induce dual-cure reaction of the monomer, ensuring stable printing process. With the layer-by-layer deposition of the material in the 3D printing process, each newly deposited layer may undergo consistent photo- and thermal-polymerization curing. Properties of photopolymer composite resin may depend on the quantity of the components utilized in the formulation. When uncured, the material may be a thixotropic liquid. The material may be transported through the feeding route by pumps and then extruded. When exposed to UV light, a photoinitiator or UV initiator may begin the polymerization reaction, causing a cured shell to form on the surface of the deposited layer, while the core remains uncured. Through the UV curing of the shell, each newly deposited layer may firmly adhere to the previous layer, preserving layer dimensions and form.

Because photopolymerization is an exothermic process, it may induce a sequential process of thermal initiation, which may prolong the polymerization time (the polymerization stress relaxation period). Prolonging this period may reduce or eliminate deformations and may make the volume shrinkage more uniform and controllable. As a result, a layer-by-layer structure may be formed with high adhesion between the layers, reduced anisotropy, and, consequently, enhanced mechanical performance. Thus, this dual-cure technique may solve the most important issues occurring during 3D-printing by photopolymerization.

Dual-curing allows working at low UV-light power, sufficient to form a thin shell of the cured polymer to preserve the integrity of the applied layer and to control the launching of thermal initiation. Thermal polymerization is implemented by selection initiator-activator ratio, allowing for reduction of the reaction starting temperature and promoting of monomer polymerization under conditions occurred as a result of the layer shell photopolymerization.

The use of dual-curing gives successful results as a stress-reducing approach. Polymerization stress magnitude is highly dependent on the composite's viscous component. The longer it takes for the composite to develop a high elastic modulus, the more time is available for polymeric chains to deform and slip into new positions to adjust to the shrinkage (internal flow), reducing or delaying contraction stress build-up. The use of consistent photo- and thermal-polymerization to compose acrylate-based constructive composite promotes an increase in the degree of conversion, flexural and tensile strength/modulus while significantly reduces polymerization stress. The prolonged thermal curing reaction of the acrylate matrix results in delayed gelation and vitrification, which, in turn, allows for stiffness development in the material to be delayed to higher conversion which led to significant polymerization stress relaxation and uniform volume shrinkage. This leads to a decrease in deformations (cracks, delaminations, distortion of the geometry of the figure) occurring during the printing process and as a result of the cooling of 3D printed samples, and also allows large-scale printing at high speeds due to an increase in the deposition rate (10-250 mm/s) and thickness (1-10 mm).

The polymerization reaction of the monomer is accompanied by the release of heat and determines the heat balance realized during the curing process. There is a temperature threshold upon which the autocatalytic reaction is induced, and the polymerization process becomes uncontrollable and leads to a high polymerization rate and a rapid accumulation of stresses, which cause the formation of cracks in the sample. Because of the low thermal conductivity of the composite resin premix and resulting composite material, the temperature control cannot be provided by external cooling performed using cooling equipment. In this case, there may be a temperature gradient (cold surface to hot bulk volume) that may cause undesirable effects related internal stress, strain and cracks.

To avoid an autocatalytic reaction, the temperature of the printed layers should be below the temperature threshold which can be achieved by a combination of the matrix and the fillers. The inorganic additives are characterized by a certain set of thermophysical properties (decomposition temperature, heat capacity, thermal conductivity), which allow for keeping the maximum temperature of the material below the autocatalytic threshold during printing.

Within photopolymerization, the main source for light scattering through the depth of the composite is the interface between the organic and inorganic phases. Moreover, the greater the mismatch between the refractive indices of the cured polymer and inorganic filler, the more light scattering takes place the lesser the penetration through the depth of material. Thus, the optical properties of the matrix and one of the fillers should coincide in order to provide the formation of the cured shell within photopolymerization with the thickness sufficient to hold deposited layer stable.

In case of dual-curing the high adhesion strength between two layers determined by the diffusion of the monomer through the layer border and the lasting time within which the uncured layer is in contact with the surface of the previously deposited layer. Improved layers adhesion ultimately reduces the anisotropy of the properties of the 3D-printed objects and enhances mechanical properties, which allow reducing material consumption for the printing of the load bearing constructions.

Dual-cure is a technique, which includes initial illumination with low-intensity UV light followed by thermal initiation allowing to solve the most important issues occurring during 3D-printing by photopolymerization.

TABLE 1

Components of Dual-Cure Composite for 3D Printing

| Components | Quantity Ranges |
|---|---|
| Organic Matrix | 10.0 to 30.0 w % |
| Inorganic Hydrate | 5.0 to 30.0 w % |
| Reinforcing Filler | 50.0 to 80.0 w % |
| UV Initiator | 0.001 to 0.2 w % |
| Thermal Initiator | 0.001 to 0.05 w % |
| Co-initiator | 0.001 to 0.05 w % |
| Dye/pigment | 0.001 to 0.05 w % |

Referencing Table 1, a formulation for a composite material to be used in dual-cure 3D printing may include an organic matrix comprising at least one of an acrylate monomer and an acrylate oligomer. The formulation may further comprise an inorganic hydrate, a reinforcing filler, a UV initiator, and a combination of thermal initiator and co-initiator (activator). In an embodiment of the formulation, the organic matrix may be found ranging between about 10.0 to 30.0 w % of the formulation. The inorganic hydrate may be found ranging between about 5.0 to 30.0 w % of the formulation. The reinforcing fillers may be found ranging between about 50.0 to 80.0 w % of the formulation. The UV initiator may be found ranging between about 0.001 to 0.2 w % of the formulation. The thermal initiator in conjunction with the co-initiator in various ratios may be found ranging between about 0.002 to 0.1 w % of the formulation (the summation of each component being found ranging between about 0.011 to 0.05 w %).

In some configurations, the organic matrix (acrylate monomer and/or acrylate oligomer) may be Triethylene glycol dimethylacrylate (TEGDMA). Some properties of TEGDMA are found in Table 2.

TABLE 2

Triethylene Glycol Dimethacrylate (TEGDMA)

| Parameter | Value |
|---|---|
| Chemical formula | $CH_2=C(CH_3)COO(CH_2CH_2O)_3COC(CH_3)=CH_2$ |
| Density | 1.092 g/mL |
| Refractive index | 1.46-1.508 |
| State of Matter | Liquid |
| Color | Transparent |

TEGDMA is a hydrophilic, low viscosity, difunctional methacrylic monomer employed as a crosslinking agent. TEGDMA is a transparent liquid that may found ranging between about 10 to 30 w % of the formulation. An exemplary matrix may include different polymeric materials. In one embodiment, the polymeric material may include one or more acrylic oligomers. An exemplary matrix material may be pre-polymerized in order to enhance the viscosity of the composite.

In some configurations, the organic matrix may be Trimethylolpropane Trimethacrylate (TMPTMA). Some properties of TMPTMA are found in Table 3.

TABLE 3

Trimethylolpropane Trimethacrylate (TMPTMA)

| Parameter | Value |
|---|---|
| Chemical formula | $[H_2C=C(CH_3)CO_2CH_2]_3CC_2H_5$ |
| Density | 1.06 g/mL |
| Refractive index | 1.472 |
| State of Matter | Liquid |
| Color | Yellow |

TMPTMA is a hydrophilic, low viscosity, reactive trifunctional methacrylate suitable for use in a wide-ranging number of polymer cross linking functions. TMPTMA is a transparent liquid that may found ranging between about 10 to 30 w % of the formulation.

In some configurations, the organic matrix may be Poly (ethylene glycol) dimethacrylate (PEGDMA). Some properties of PEGDMA are found in Table 4.

TABLE 4

Poly(ethylene glycol) dimethacrylate (PEGDMA)

| Parameter | Value |
|---|---|
| Chemical formula | $C_3H_5C(O)(OCH_2CH_2)_nOC(O)C_3H_5$ |
| Density | 1.099 g/mL |

TABLE 4-continued

Poly(ethylene glycol) dimethacrylate (PEGDMA)

| Parameter | Value |
|---|---|
| Refractive index | 1.464-1.468 |
| State of Matter | Liquid |
| Color | Transparent |

PEGDMA is a long-chain hydrophilic, crosslinking monomer. PEGDMA is a transparent liquid that may found ranging between about 10 to 30 w % of the formulation.

In some configurations, a combination of inorganic fillers comprising at least one reinforcing filler and inorganic hydrate may be used. The inorganic hydrate may be an inorganic mineral possessing the initial dehydration temperature range needed to keep the composite temperature below the autocatalytic threshold during printing and a refractive index conforming the refractive index of the cured organic matrix. In the disclosed formulation, temperature control is achieved by a combination of the matrix and the fillers. The inorganic additives (inorganic hydrates) are characterized by a certain set of thermophysical properties (decomposition temperature, heat capacity, thermal conductivity), which maintain the maximum temperature of the material below the autocatalytic threshold temperature during printing.

In some configurations, the inorganic hydrate may be borax decahydrate. Some properties of borax decahydrate may be found in Table 5.

TABLE 5

Borax Decahydrate

| Parameter | Value | |
|---|---|---|
| Chemical formula | $Na_2B_4O_7 \cdot 10H_2O$ | |
| State of Matter | Solid Powder | |
| Volume weight | 0.85 g/cm³ | |
| Initial decomposition temperature | 60-70° C. | |
| Refractive index | 1.46-1.47 | |
| Foreign impurities | No impurities | |
| Particle size distribution | D (10) | 110 ± 20 μm |
| | D (50) | 310 ± 40 μm |
| | D (90) | 700 ± 120 μm |
| | D max | 2800 ± 300 μm |
| Solubility in organic matrix | Insoluble | |

Borax decahydrate is a solid white powder that may be provided in large bags for industrial use. Borax decahydrate may be found ranging between about 5.0 to 30.0 w % of the formulation when combined with the reinforcing fillers but is not limited thereto.

In some configurations, the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof. Some properties of the aluminum oxide trihydrate that may be shared with the aluminum oxide trihydrate mixture may be found in Table 6.

TABLE 6

Aluminum Oxide Trihydrate

| Parameter | Value |
|---|---|
| Chemical formula | $Al(OH)_3$ |
| State of Matter | Solid Powder |

TABLE 6-continued

Aluminum Oxide Trihydrate

| Parameter | Value | |
|---|---|---|
| Volume weight | 0.7 g/cm³ | |
| Refractive index | 1.56-1.58 | |
| Foreign impurities | No impurities | |
| Particle size distribution | D (10) | 5 ± 1 μm |
| | D (50) | 25 ± 5 μm |
| | D (90) | 85 ± 15 μm |
| | D max | 200 ± 50 μm |
| Solubility in organic matrix | Insoluble | |

Aluminum oxide trihydrate is a solid white powder that may be provided in large bags for industrial use. Aluminum oxide trihydrate may be used as a flame retardant and reinforcing filler for the polymer matrix.

In some configurations, the UV initiator may be bisacylphosphine oxides (BAPO)s. Some properties of the BAPO may be found in Table 7.

TABLE 7

Bisacylphosphine oxides (BAPO)

| Parameter | Value |
|---|---|
| Chemical formula | Phenylbis(2,4,6-trimethylbenzoyl)phosphine oxide |
| State of Matter | Solid Powder |
| Color | Yellowish |
| Solubility in organic matrix | High solubility |

The UV initiator may induce the polymerization of the organic matrix under UV-light of a specified wavelength.

In some configurations, the thermal initiator may be benzoyl peroxide (BPO). Some properties of BPO may be found in Table 8.

TABLE 8

Benzoyl Peroxide (BPO)

| Parameter | Value |
|---|---|
| Chemical formula | $C_{14}H_{10}O_4$ |
| State of Matter | Solid Powder |
| Color | White |
| Solubility in TEGDMA | 15 w %, 23° C. |

The thermal initiation may be launched by decomposition of the BPO catalyzed by the amine activator.

The co-initiator may be bisomer PTE. Some properties of co-initiator are given in Table 9.

TABLE 9

Bisomer PTE

| Parameter | Value |
|---|---|
| Chemical formula | N,N-BIS-(2-HYDROXYETHYL)-PARA-TOLUIDINE |
| State of Matter | Liquid |
| Color | Dark Orange |
| Solubility in TEGDMA | High Solubility |

In some configurations, the co-initiator may be added into a formulation in advance or may be dissolved in a suitable organic solvent separately from the composition mixture and added into a formulation right before extrusion.

In some configurations, a dye may be found ranging between about 0.01 to 0.05 w % of the formulation.

The three-dimensional object is formed from the composite resin premix containing components described above by additive manufacturing process, typically layer-by-layer extrusion additive manufacturing. The formulation may be created following the method disclosed herein. A resin premix may be generated by blending the acrylate monomers and/or acrylate oligomers, the UV initiator, the thermal co-initiator, and the fillers through operation of the blender for a between about 5 and 20 minutes. The photopolymer composite resin may then by created by blending the thermal initiator and the resin premix for a second amount of time. Methods of generating the formulation are described in further detail with regard to FIG. 3 and FIG. 4.

The 3D printed composite material may be formed by any suitable method. An exemplary method includes layer-by-layer deposition of the composite resin premix followed by light irradiation. An exemplary light radiation may be obtained using UV-light or near-UV visible light source. The light intensity must be high enough to ensure sufficient curing of the resin at the surface. Because of the solid surface, the extruded layer keeps its shape and allows the following layers to be extruded on top of it. At the same time, the polymerization front is being formed, which propagates from the surface to the bulk volume of the extruded layer. Simultaneously with light irradiation, or in a short time after the extruded layer was exposed to the light, the thermal polymerization reaction develops and ensures curing of the whole internal volume of the extruded layer. A 3D printing system capable of creating a 3D printed composite material as disclosed herein is described in further detail with regard to FIG. 4 and FIG. 6.

FIG. 1 shows an exemplary end material 100 that may be produced via 3D printing. The end material 100 is shown as including a matrix material 102. The matrix material 102 may be formed via 3D printing.

Exemplary matrix material 102 may include a polymeric material. In one embodiment, the polymeric material may include one or more acrylic polymers. An exemplary acrylic polymer may include any polymer that is a product of polymerization of an acrylic acid, an acrylate (or ester of an acrylic acid), and/or a derivative thereof.

The end material 100 may be formed by any suitable methods. An exemplary method may include polymerization. Exemplary polymerization may include photopolymerization, such as radical photopolymerization. In one embodiment, the end material 100 may be formed by a 3D printing process that is based on photopolymerization. Exemplary 3D printing processes may include stereolithography (or SLA, SL, optical fabrication, photo-solidification, resin printing), binder jetting, directed energy deposition, material jetting, powder bed fusion, sheet lamination, vat photopolymerization, or a combination thereof.

Figure 2:
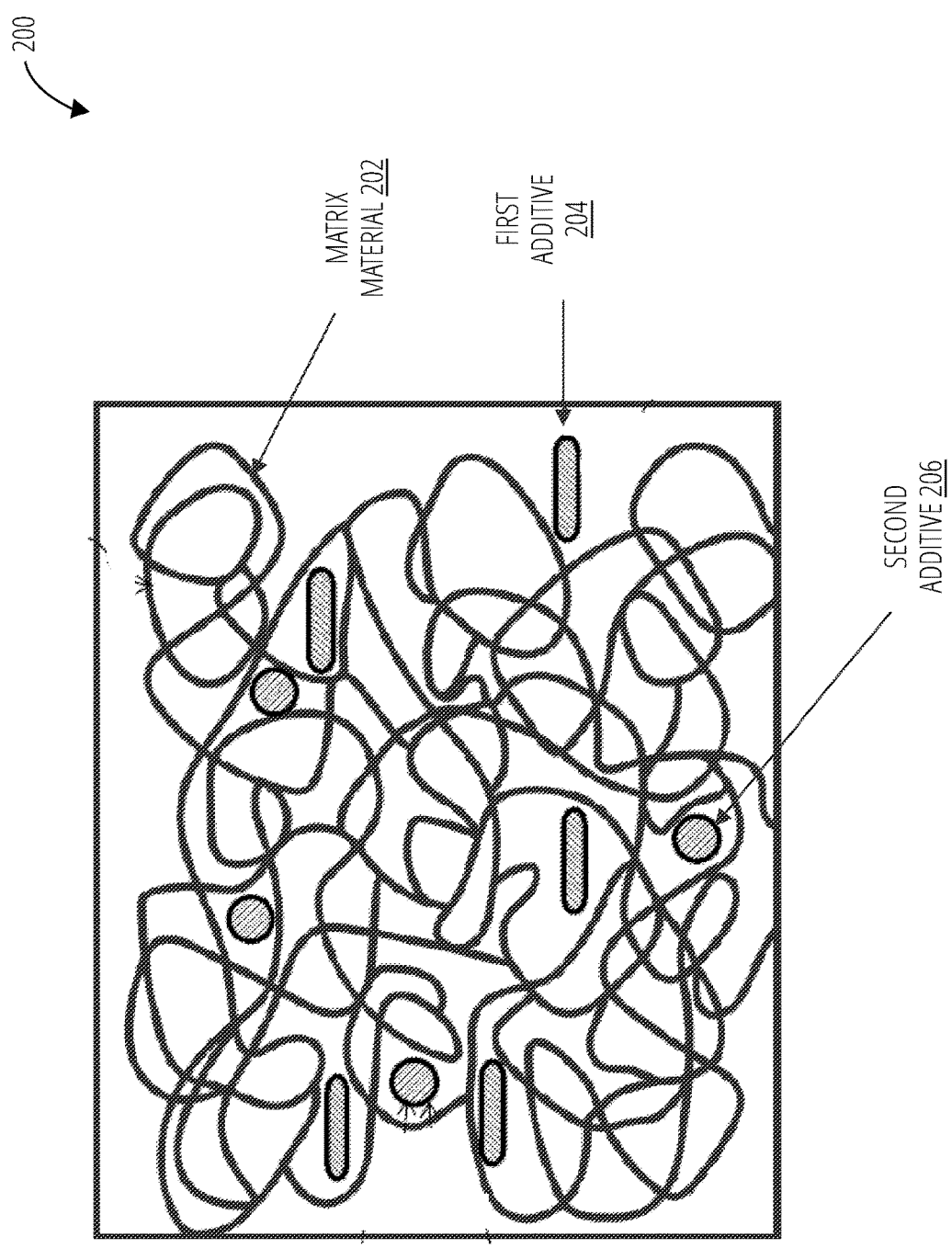
FIG. 2 illustrates end material 200 in accordance with one embodiment.

Referencing FIG. 2, the end material 200 is shown as including at least one additive each being embedded and/or mixed within the matrix material 202 at a selected concentration, respectively. Each additive may include particles and/or compounds that possess one or more selected properties. Advantageously, the properties of the additive may be imparted to the end material 200. As illustratively shown in FIG. 2, the additive in one embodiment may include a first additive 204 and a second additive 206. Each of the first additive 204 and second additive 206 may provide a respective function to the end material 200.

In one embodiment, the additive may include a reinforcing additive. The reinforcing additive may improve mechanical properties of the end material 200. For example, the reinforcement additive may increase tensile, flexural, and compressive strength of the end material 200 and/or decrease shrinkage of the end material 200 before and after 3D printing. Exemplary reinforcing additive may include calcium carbonate, talc, silica, wollastonite, clay, calcium sulfate fibers, mica, glass beads, glass fibers, or a combination thereof. The reinforcing additive may be mixed in the end material 200 in the form of particles. The reinforcing additive particles may be in the form of round and freeform granules, microcrystals of various shapes, fibers, threads, or a combination thereof. The reinforcing additive may be embedded in the end material 200 at any suitable concentrations. For example, mass percentage (or weight percentage) of the reinforcing additive in the end material 200 may range between about 5 to 80 w % of the end material 200.

Additionally and/or alternatively, the at least one additive may include a flame-retardant additive. In one embodiment, the flame-retardant additive may be mineral-based and/or mineral-occurred. Stated somewhat differently, the flame-retardant additive may be of a natural origin. For example, the flame-retardant additive may be derived from a mineral. Exemplary flame-retardant additives may include aluminum oxide trihydrate, sodium tetraborate decahydrate, boric acid, sodium phosphate, ammonium sulfate, sodium tetraborate, aluminum hydroxide, or a combination thereof. In contrast to common halogen-based flame retardants, use of the mineral-based flame-retardant additive may eliminate the presence of toxic substances in combustion products and advantageously be environmentally beneficial.

Additionally and/or alternatively, the mineral-based flame-retardant additive may be more resistant to blooming than non-mineral-based flame retardants, including phosphoric acid esters, aluminum polyphosphate, red phosphorus, and other halogen-free flame retardants. Advantageously, the functional stability of the end material 200 does not degrade with the passage of time. The flame-retardant additive may be embedded in the end material 200 in the form of particles. The reinforcing additive particles may be in the form of round and freeform granules, microcrystals of various shapes, or a combination thereof. The flame-retardant additive may be mixed in the end material 200 at any suitable concentrations. For example, mass percentage of the flame-retardant additive in the end material 200 may range between about 35 to 75 w %, or from about 45 to 65 w % of the end material 200.

Additionally and/or alternatively, the at least one additive may include a coloring agent for coloring the end material 200. Exemplary coloring agents may include a pigment, a dye, or a combination thereof. Additionally and/or alternatively, the at least one additive may include a glittering agent for providing a glittering effect to the appearance of the end material 200. Additionally and/or alternatively, the at least one additive may include an aromatic agent for generating an aromatic smell from the end material 200. Advantageously, the end material 200 may have a monolithic amorphous structure with low porosity. The end material 200 may be stronger and lighter than concrete and brick, and resistant to moisture and chemicals. Exemplary end material 200 may be made by curing non-toxic acrylic-based oligomers and a minimal quantity of photoinitiator, so the making of end material 200 may be safer for health reasons.

Although FIG. 2 shows the end material 200 as including the first additive 204 and the second additive 206 for illustrative purposes only, the end material 200 may include no additives, or may include any number of uniform and/or different additives, without limitation. Use of the same matrix material 202 with various combinations of the additives in the end material 200 allows obtaining the end material 200 for a wide range of applications.

Figure 3:
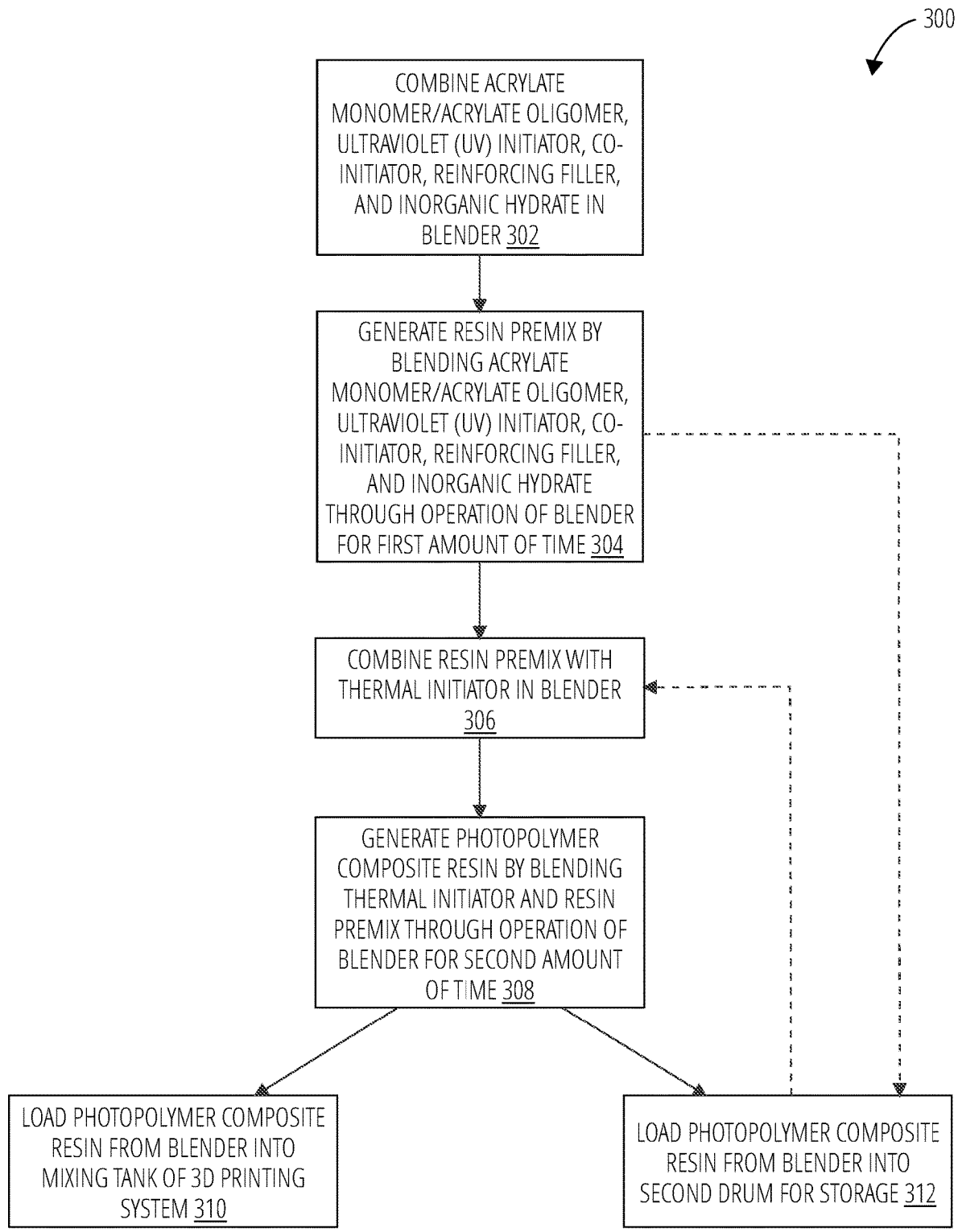
FIG. 3 illustrates a method 300 in accordance with one embodiment.

Referencing FIG. 3, a method 300 of generating a formulation of a photopolymer composite material for use in a 3D printing system involves combining at least one of an acrylate monomer and acrylate oligomer ranging between about 10.0 to 30.0 w % of the formulation in a blender, along with an ultraviolet (UV) initiator ranging between about 0.001 to 0.2 w % of the formulation, a co-initiator ranging between about 0.001 to 0.05 w % of the formulation, a reinforcing filler ranging between about 50.0 to 80.0 w % of the formulation, and an inorganic hydrate ranging between about 5.0 to 30.0 w % of the formulation (block 302). In block 304, the method 300 generates a resin premix by blending the acrylate monomer/acrylate oligomer, the UV initiator, the co-initiator, the reinforcing filler, and the inorganic hydrate through operation of the blender for a first amount of time ranging between about 5 and 20 minutes±0.5 minutes.

In block 306, the method 300 combines the resin premix with a thermal initiator ranging between about 0.001 to 0.05 w % of the formulation in the blender. In block 308, the method 300 generates a photopolymer composite resin by blending the thermal initiator and the resin premix through operation of the blender for a second amount of time ranging between about 5 seconds and 5 minutes.

In some configurations, the method 300 loads the photopolymer composite resin from the blender into a mixing tank of a 3D printing system (block 310). In some instances, in an operation after block 304 and before loading the thermal initiator, the mixing tank may not be available, and the method 300 loads the photopolymer composite resin from the blender into a second drum for storage (block 312). In this scenario, block 312 returns to block 306 for the addition of the thermal initiator. In some embodiments, this method may be performed because the combination of the resin premix and the thermal initiator cannot be stored together for longer than about 1 hour. In other embodiments, the photopolymer composite resin without the thermal initiator, stored in the second drum, may be mixed with a mixer after a time interval ranging between about 3 hours to 7 days±0.2 hours before it is transferred from the second drum into a mixing tank of a 3D printing system.

Figure 4:
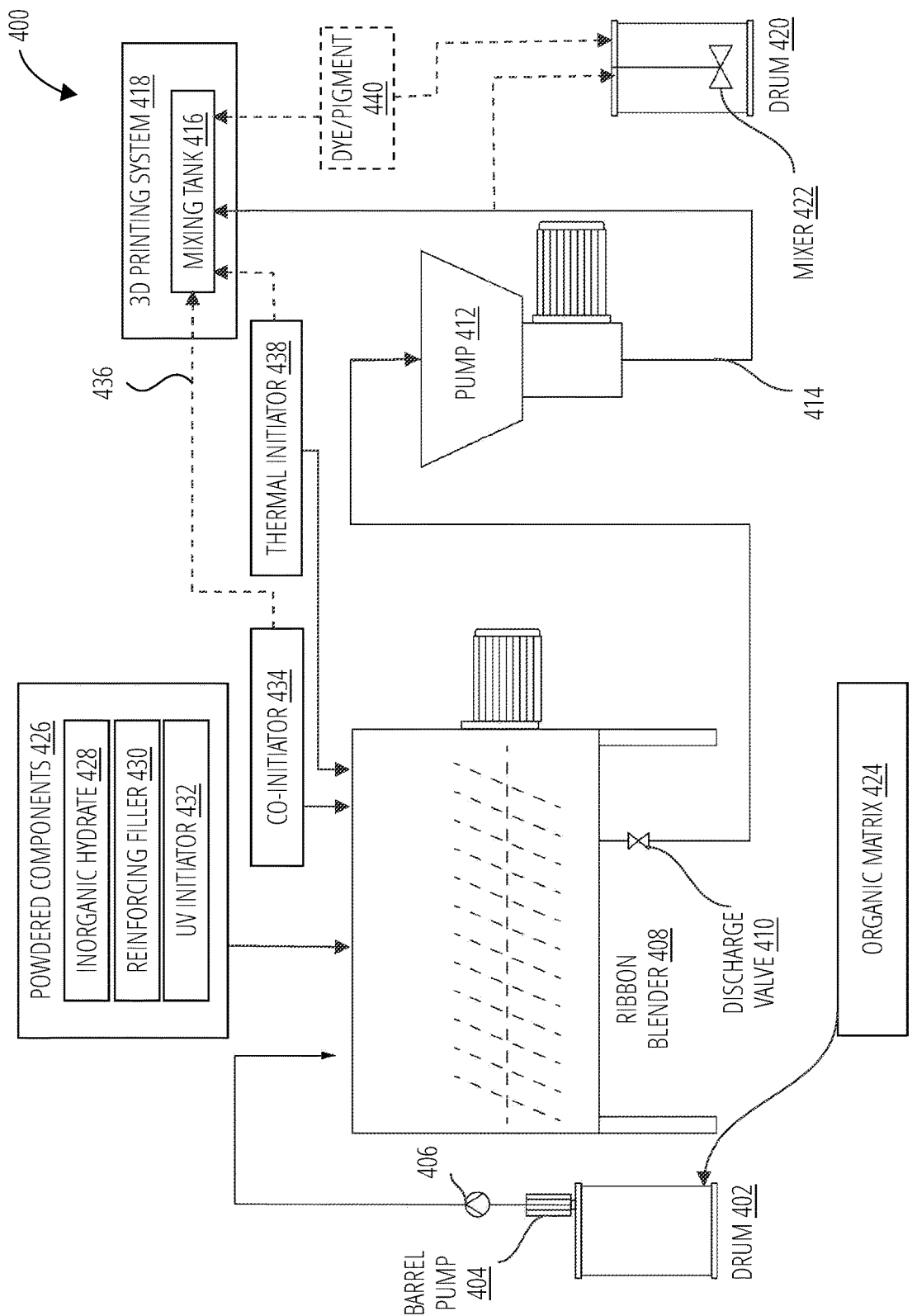
FIG. 4 illustrates a mixing system and feeding system 400 in accordance with one embodiment.

FIG. 4 illustrates an embodiment of a mixing system and feeding system 400 for generating the photopolymer composite resin for use in a 3D printing system. The mixing system and feeding system 400 comprise a drum 402, a barrel pump 404, a flow meter 406, a ribbon blender 408, a discharge valve 410, a pump 412, a hose 414, and a mixing tank 416 of a 3D printing system 418.

A drum 402 comprising the organic matrix 424 may be moved to the location of the barrel pump 404. The organic matrix 424 may comprise at least one of an acrylate monomer and an acrylate oligomer. The lid of the drum 402 may be cleaned to remove any dust. A special tool may be placed on the lid of the drum to remove the barrel cap (the larger of the two on the drum's lid). The level of organic matrix 424 inside the drum may be measured and at between about 1-3" from the top. A barrel pump 404 may be installed into the cap hole of the barrel in a vertical position. The barrel pump 404 may be placed in fluid communication with an empty ribbon blender 408. The blender's discharge valve 410 may be in the "closed" position. The barrel pump 404 may be activ the organic matrix 424 into the ribbon blender 408 may be monitored through a flow meter 406. The barrel pump 404 may be turned off as soon as the required volume of the organic matrix 424 has been transferred to the ribbon blender 408, such that the organic matrix 424 may be found ranging between about 10.0 to 30.0 w % of the formulation. If the drum 402 is emptied during the pumping procedure, the barrel pump 404 may be turned off and reinstalled onto the next drum to continue pumping.

After the organic matrix 424 is added to the ribbon blender 408, the powdered components 426 may be added into the ribbon blender. The powdered components 426 may comprise the UV initiator 432, the inorganic hydrate 428, and the reinforcing filler 430.

The UV initiator 432 may be added to the organic matrix 424 within the ribbon blender 408 ranging between about 0.001 to 0.2 w % of the formulation. The empty container of the UV initiator 432 may be weighed to ensure that the desired amount of UV initiator 432 has been added to the ribbon blender 408. If some amount of UV initiator 432 has not been loaded into the ribbon blender 408, the loading procedure may be repeated. After the UV initiator 432 has been added, the container may be closed to protect the powder from sunlight and moisture.

The co-initiator 434 may be added to the organic matrix 424 within the ribbon blender 408 ranging between about 0.001 to 0.05 w % of the formulation. The empty container of the co-initiator 434 may be weighed to ensure that the desired amount of co-initiator 434 has been added to the ribbon blender 408. If some amount of co-initiator 434 has not been loaded into the ribbon blender 408, the loading procedure may be repeated. In some configurations, the co-initiator may be added into a formulation in advance. In some configurations, the co-initiator may be dissolved in a suitable organic solvent 436 separately from the composition mixture and may be added into a formulation right before extrusion by the 3D printing system 418.

In some formulations, an acrylate prepolymer may be generated by short-term irradiation of acrylic monomers/oligomers combined with limited amount of photoinitiator. This action may increase viscosity of the acrylic monomers/oligomers to prevent filler particles from sedimentation and may allow the reactivity of the resulting prepolymer mixture to be adjusted.

The reinforcing filler 430 may be added after the UV initiator 432. In some instances, the reinforcing filler 430 may come in 55lb bags. To ensure that the correct amount of the reinforcing filler 430 is added, the bag of the reinforcing filler 430 may be placed on a floor scale and weighted to obtain the total mass of the load. A safety grating may be installed within the ribbon blender 408, and the bag of the reinforcing filler 430 may be opened and loaded into the ribbon blender 408 through the safety grating. When the bag is emptied after loading, the empty bag may be weighed. The mass of reinforcing filler 430 inside the ribbon blender 408 may be calculated by subtracting the weight of the emptied bag from the total mass weight taken initially. Additional reinforcing filler 430 may be added to the ribbon blender 408 to meet the quantity range of about 50.0 to 80.0 w % of the formulation. The ribbon blender 408 may then be turned on for about 10 minutes to form a premix resin from the components before adding the inorganic hydrate 428.

The inorganic hydrate 428 may be added after the reinforcing filler 430. In some instances, the inorganic hydrate 428 may come in 55lb bags. To ensure that the correct amount of the inorganic hydrate 428 is added, the bag of the inorganic hydrate 428 may be placed on a floor scale and weighted to obtain the total mass of the load. A safety grating may be installed within the ribbon blender 408, and the bag of the inorganic hydrate 428 may be opened and loaded into the ribbon blender 408 through the safety grating. When the bag is emptied after loading, the empty bag may be weighed. The mass of inorganic hydrate 428 inside the ribbon blender 408 may be calculated by subtracting the weight of the emptied bag from the total mass weight taken initially. Additional inorganic hydrate 428 may added to the ribbon blender 408 to meet the quantity range of about 5.0 to 30.0 w % of the formulation. The ribbon blender 408 may then be run for 12 hours in order to mix the components.

In some formulations, the resin premix may be generated by blending the organic matrix 424, the UV initiator 432, the thermal co-initiator 434, and the fillers through operation of the ribbon blender 408 for a first amount of time ranging between 5 minutes and 20 minutes, followed by blending with the thermal initiator 438 in liquid form for a second amount of time ranging between 5 seconds and 60 seconds. The thermal initiator 438 may be at least partially dissolved in acrylate monomer to form the liquid thermal initiator.

In some formulations, the resin premix may be generated by blending the organic matrix 424, the UV initiator 432, the thermal co-initiator 434, and the fillers through operation of the ribbon blender 408 for a first amount of time ranging between about 5 and 20 minutes, followed by blending with the thermal initiator 438 in powder form for a second amount of time ranging between 30 seconds and 5 minutes. The thermal initiator 438 may be added such that it may be found in the quantity range of about 0.001 to 0.05 w % of the formulation.

The pump 412 may be positioned underneath a discharge valve 410 of the ribbon blender 408. In an embodiment, the pump 412 may be connected to the mixing tank 416 of a large gantry 3D printing system 418 through the use of a hose 414. Any appropriate 3D printing system may be used, and the disclosure is not limited to the large gantry 3D system. The gantry system (GS) mixing tank 416 may be inspected to ensure that it is operational and ready to receive the mixed components as a resin. The pump may be turned on before the discharge valve 410 is moved into the "open" position. The GS mixing tank 416 may be inspected to ensure that the photopolymer composite resin is being collected. When the flow rate of resin from the ribbon blender 408 starts to decrease, the ribbon blender 408 may be turned on to push the remnants of the resin into the pump's hopper. The pumping procedure may end when the ribbon blender 408 is emptied, at which point the ribbon blender 408 and the pump may be turned off.

In some embodiments, the resin premix generated by blending the organic matrix 424, the UV initiator 432, the thermal co-initiator 434, and the fillers through operation of the ribbon blender 408 for a first amount of time ranging between about 5 and 20 minutes may be blended with the thermal initiator 438 for a second amount of time directly in the extruder of the 3D printing system 418, before the resin premix is deposited and cured.

In some instances, the GS mixing tank 416 may be unavailable to receive the photopolymer composite resin, and the resin may be loaded into a storage drum 420. The hose 414 from the pump 412 may be positioned and secured within the storage drum 420 instead of the GS mixing tank 416. The pump may be turned on before the discharge valve 410 is moved into the "open" position. When the flow rate of resin from the ribbon blender 408 starts to decrease, the ribbon blender 408 may be turned on to push the remnants of the resin into the pump's hopper. The photopolymer composite resin from the ribbon blender 408 may be pumped into one or more drums, based on the total volume of the resin within the ribbon blender 408. If a pump 412 cannot be used, an empty drum may be placed beneath the discharge valve 410, and the discharge valve 410 may be opened to pour the photopolymer composite resin into the drum. The discharge valve 410 may be closed as soon as the drum is full.

In some embodiments, the resin premix generated by blending the organic matrix 424, the UV initiator 432, the thermal co-initiator 434, and the fillers through operation of the blender for a first amount of time ranging between about 5 and 20 minutes may be stored for a period of time up to 12 months before being blended with the thermal initiator 438 for a second amount of time.

Before printing with the photopolymer composite resin stored in a storage drum 420, the resin may require mixing. A mixer 422 such as a manual mixer may be utilized to mix the resin before transferring the resin to a GS mixing tank 416. The lid of the storage drum 420 may be opened and the paddle of the mixer 422 may be positioned into the drum between the center of the drum and the inner wall. The upper layer of the resin may be mixed by moving the paddle clockwise with the mixer on until the upper layer of the drum becomes homogenous. The paddle may then be pushed to the bottom of the drum. The bottom layer may then be mixed by moving the paddle outward from the center, then up toward the upper layer of the resin near the inner wall of drum, then pushed back down toward the bottom of the drum while being moved in a counter clockwise rotation around the center of the drum. Mixing may continue until the resin is homogenous.

To prevent the contamination of the inner surface of the ribbon blender 408 with dye/pigment 440, which may influence the production of uncolored resin, the coloring procedure may be carried out on photopolymer composite resin in storage drums, which may then be labeled in accordance with the color of the dye/pigment 440 used. The necessary amount of dye/pigment 440 may be weighed out and placed into a layer of resin within the drum. A manual mixer may be utilized to mix the dye/pigment 440 with the photopolymer composite resin. After the dye/pigment 440 has been added, the resin in the drum may be mixed again after about 24 hours of storage before it is ready to be transferred to the GS mixing tank for use in 3D printing.

After about 12 hours of continuous mixing, the photopolymer composite resin may be considered to be ready for use. The photopolymer composite resin may require handling while in storage. As resin is pumped into the GS mixing tank, it may be mixed continuously until it is all consumed. Up to about 3 hours without mixing may be acceptable. In cases where the resin is kept in drums for long-term storage, the following criteria may need to be met:
  Keep drums sealed at all times
  Avoid exposing resin to light and moisture
  Keep foreign impurities out of drums
  Manually mix resin once every seven days
  Do not attempt to print with resin that has gone unmixed for more than three hours In some instances, the resin may undergo a quality assurance process. After the resin has been mixed for about 12 continuous hours, a 500 mL batch may be taken for testing. Three samples may be obtained while pumping a batch out from the ribbon blender. All samples may be taken from the hose end to the GS mixing tank or the second drum.

A first sample of about 150 to 200 mL may be taken 10 to 15 seconds after pumping begins. A second sample of about 150 to 200 mL may be taken in the middle of the pumping procedure. A third sample of about 150 to 200 mL may be taken 10 to 15 seconds before pumping stops.

For resin in drum storage, the sampling procedure may be as follows:

A first sample of about 150 to 200 mL may be taken from the first drum

A second sample of about 150 to 200 mL may be taken from the second drum

A third sample of about 150 to 200 mL may be taken from the third drum

Storage in this embodiment may use three different drums, since a single load of the mixer may be equal to three drums in volume. About 100 mL from each sample may be put into a glass or PE container, mixed well, and sealed for quality assurance procedures.

Figure 5:
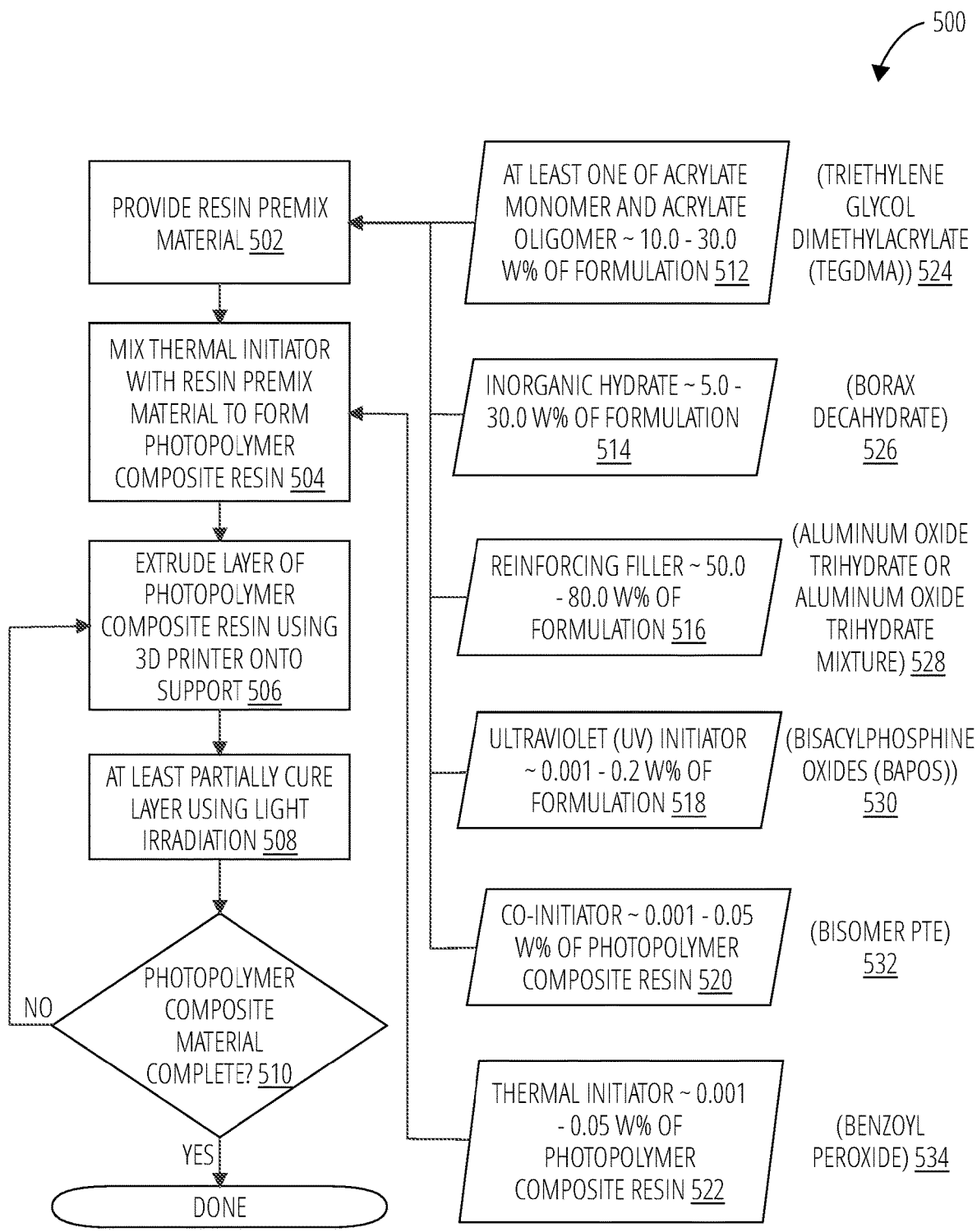
FIG. 5 illustrates a method 500 in accordance with one embodiment.

FIG. 5 illustrates a method 500 in accordance with one embodiment. In block 502, a resin premix material is provided. The resin premix may comprise at least one of acrylate monomer and acrylate oligomer~10.0-30.0 w % of formulation 512, which in some embodiments may be Triethylene glycol dimethylacrylate (TEGDMA) 524. The resin premix may further comprise inorganic hydrate~5.0-30.0 w % of formulation 514, which in some embodiments may be borax decahydrate 526. The resin premix may further comprise reinforcing filler~50.0-80.0 w % of formulation 516, which in some embodiments may be aluminum oxide trihydrate or aluminum oxide trihydrate mixture 528. The resin premix may further comprise ultraviolet (UV) initiator~0.001-0.2 w % of formulation 518, which in some embodiments may be bisacylphosphine oxides (BAPOs) 530. Finally, the resin premix may comprise co-initiator~0.001-0.05 w % of photopolymer composite resin 520, which in some embodiments may be bisomer PTE 532.

In block 504, the resin premix provided in block 502 is mixed with thermal initiator~0.001-0.05 w % of photopolymer composite resin 522, which in some embodiments may be benzoyl peroxide 534 to form a photopolymer composite resin.

In block 506, the photopolymer composite resin is extruded by a 3D printer into a layer. The first layer rests upon a support. Subsequent layers are extruded onto previous layers, to build up a material layer-by-layer. In block 508, the layer just extruded is at least partially cured using light irradiation. This curing irradiation may be provided by a UV curing module. If the final photopolymer composite material desired is not yet complete, decision block 510 goes back to repeat block 506 and block 508 until the material is complete. Once the final desired material has been built, the method 500 is complete.

Figure 6:
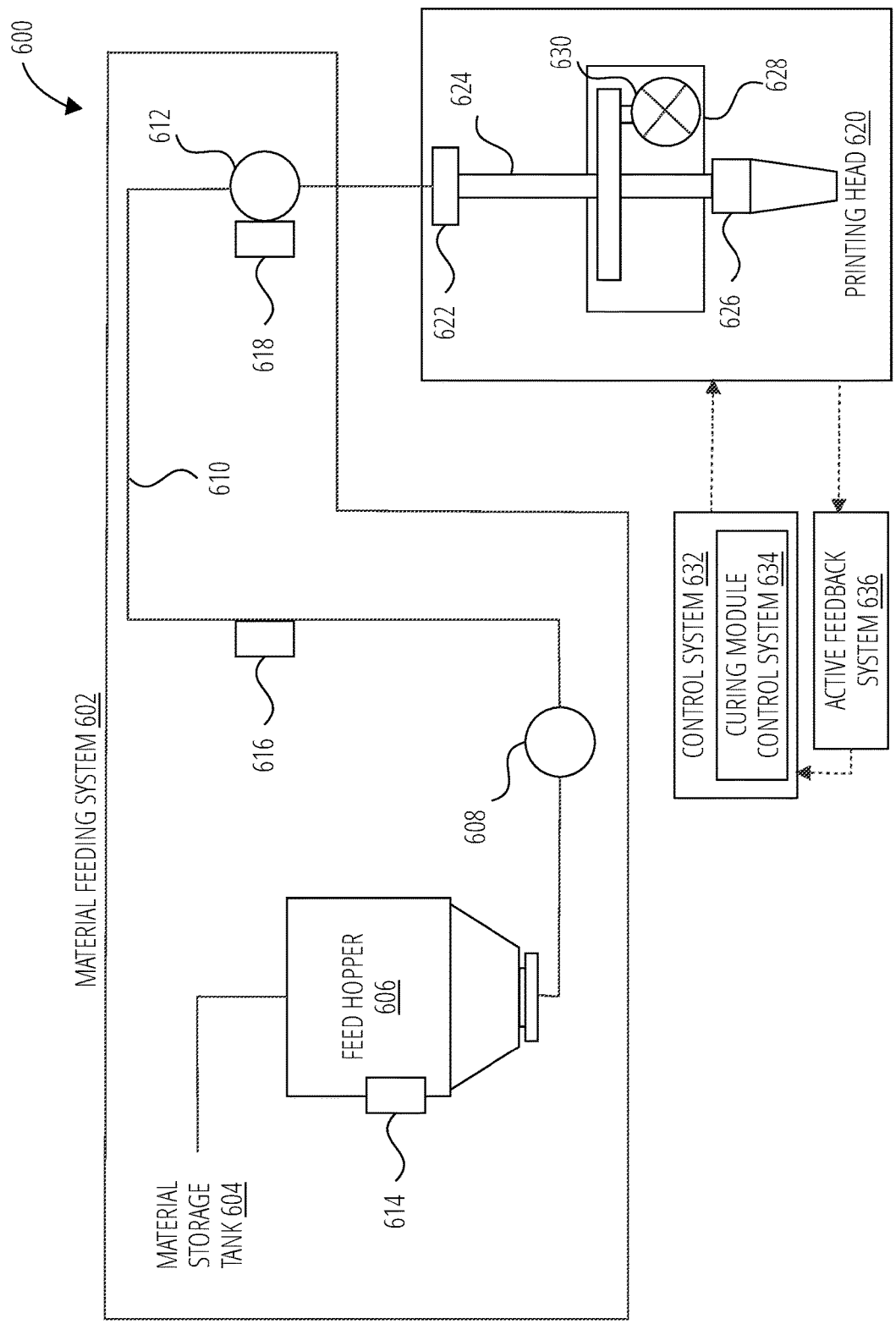
FIG. 6 illustrates a printing system 600 in accordance with one embodiment.

Referencing FIG. 6, a printing system 600 comprises a material feeding system 602, a printing head 620, and a control system 632. The material feeding system 602 comprises an input from a material storage tank 604, a material feed hopper 606, pumps for feeding material from the hopper (dosing pump 612 and/or at least one feeding pump 608), and supply hoses 610 with auxiliary equipment (auxiliary equipment 614, auxiliary equipment 616, and auxiliary equipment 618) to assist the movement of the material to the printing head 620. The printing head system comprises a connector 622, an extruder 624, a nozzle 626, and a curing module 628, which may include at least one light curing module 630.

The material feeding system 602 may be substantially similar in whole or part to the mixing system and feeding system 400 illustrated in FIG. 4. The control system 632 may be operatively connected to the curing module 628 allowing the control system 632 to control operation of the curing module 628. In some configurations, the printing head includes an active feedback system 636 for monitoring material curing and communicating information to the control system 632.

In some configurations, the control system 632 may include control systems that control the curing module, such as the curing module control system 634. In this configuration, the curing module control system 634 may control, for example, the activation of LEDs in the curing module and their output intensity. The separation of the systems may facilitate maintenance and allow for the exchange or substitution of the modules for different printing jobs. For instance, the curing module may be replaced with its corresponding control system instead for a curing module and control system with different operational parameters better suited for the particular printing job. In this configuration, the active feedback system 636 may communicate information to the curing module control system 634. The control system 632 may be substantially similar to the embodiment illustrated in FIG. 7.

Figure 7:
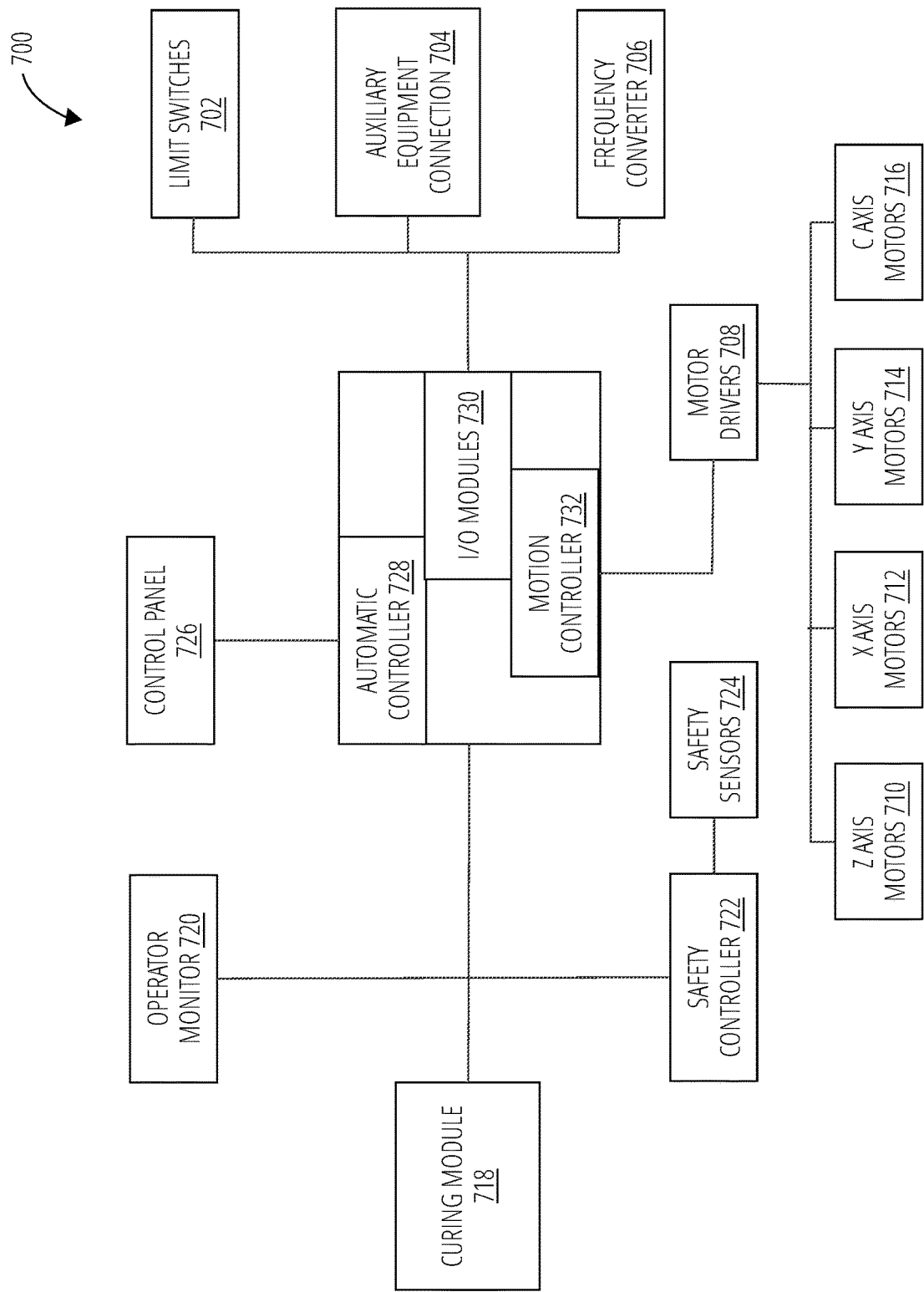
FIG. 7 illustrates a control system 700 in accordance with one embodiment.

Referencing FIG. 7, the control system 700 comprises an automatic controller 728 communicating with a control panel 726, a motion controller 732 communicating with motor drivers 708, and input/output modules 730 communicating with limit switches 702, an auxiliary equipment connection 704, and a frequency converter 706. The motor drivers 708 communicate with Z axis motors 710, X axis motors 712, and Y axis motors 714, for positioning the printing head within the printing area. The motor drivers 708 additionally control C axis motors 716 that control the position of the curing module of the printing head with respect to the extruder and nozzle. The control system 700 also communicates with an operator monitor 720 and a safety controller 722 that communicates with safety sensors 724.

The control system 700 additionally communicates with curing module 718, controlling operation of the curing module 718 for irradiating the poured resin for curing.

The control system 700 may include an electronics unit with software for manual and automatic modes of operation. The control system 700 may be operated to monitor and control operations of controlled systems such as the positioning system, material feeding system, printing head system, and auxiliary equipment (such as CNC milling/smoothing system). The control of the positioning system may be based upon the principles of Computer Numerical Control (CNC). Control of the material feeding system and printing head system may be based on the principles of automatic control and may utilize software algorithms to provide real-time monitoring and control of the processes. The auxiliary equipment controls may include safe operation sensors, emergency sensors and additional safety systems and equipment.

Human monitoring and control systems may provide function monitoring and manual control operation by the 3D printer operator. Communication interfaces provide data communication between the different devices and are also used for G-code program loading to the control system.

The positioning system may include a rigid frame assembled from an industrial grade aluminum profile rigidly fixed inside the freight container or other suitable positioning systems, such as a portal-based system. The build platform is represented by the inner floor surface of the freight container. The 4-axis linear motion system may include linear guides, stepper motors with reduction gears, ball-screw pairs, a belt drive, and end position sensors.

In an exemplary material extrusion process, a printing material is fed by a material-feeding system through the deposition nozzle. The nozzle traverses via a positioning system to build up an object while a curing module 718 cures the viscous material, forming a hard structure layer by layer. The curing module 718 may be an Ultraviolet (UV) optic system. Operation of the curing module 718 may be configured through the control system 700. The control system 700 may monitor and control variables of the printing process that are translated from programming instructions loaded by a user. Key process variables, which may make up a print profile, may include material, nozzle diameter, print speed (a combined parameter made up of the feed rate of the material and the movement speed of the positioning system), curing module 718 power usage, curing module intensity, (e.g., light intensity), curing module 718 position, and layer thickness.

The control system may also control operation and movement of the printing head. The printing head moves along programmed line segments on the XY plane and extrudes a viscous printing material which is cured by irradiation from the curing module. The cured material hardens and adheres to the previous layer. After executing all of the commands for the current layer, the printer gantry moves upward by the height of one layer (ZY and ZX plane) and starts to print the next layer. A designed object may be formed by repeating this process for all of the layers. An example of the programmatic instruction utilized to control the printing head are found below.

G-Code
Sep XX, 20XX at 11:40:43 AM
Settings Summary
processName, top_1
applyToModels, test_1.0
profileName, Container
profileVersion, 20XX-06-XX 11:29:58
baseProfile, Default
printMaterial,FS
printOuality, Fast
printExtruders,
extruderName,extruder 1
extruderDiameter, 20
layerHeight, 4
exportFileFormat, gcode
defaultSpeed, 1800
rapidXYspeed, 18000
rapidZspeed,3000
G90
M82
M106 S255
M104 SO TO
G28; home all axes
G1 Z4.000 F3000
process top_1
Layer 1, Z=4.000
TO
tool H4.000 W20.400
external single extrusion
G1 X53.606 Y234.319 F18000
G92 E0
tool H4.000 W20.823
G1 X57.672 Y233.605 E3.0405 F1800
tool H4.000 W20.055
G1 X61.738 Y233.551 ES.9250

In some configurations, the printing head may be operatively coupled to a non gantry type printing system to position and orient the printing head in the formation of the printed component. For instance, the printing head may be operatively coupled to an articulating arm (e.g., spider, robotic arm, etc.) that moves and positions the printing head within the three-dimensional space of the printing area to form the extruded material layers of the printed component. In this configuration, the programmatic instructions may differ from the programmatic instructions utilized in the gantry system to account for the different range of motion provided by the different system.

In some configurations, the control signal may be communicated to the printing head through a wired communications method (e.g., ethernet, USB, fiber optic cable, etc.). The wired communications method may be combined with the cables that deliver power to the LEDs and movement of the curing module. The wired connection for control signals to the curing module may be combined in a wiring harness/assembly with the power cable for the curing module.

In some configurations, the control signal may be communicated to the printing head through a wireless communications system. The utilization of the wireless communications system to communicate and receive the control signals between the printing head and the control system may eliminate the disadvantages associated with hard wiring such as weight reduction and the possibility of wires interfering with the printing process, extruded material layer, etc.

The material feeding system may include input from a material storage tank, a material feed hopper, pumps for feeding material from the hopper, and supply hoses with auxiliary equipment that carry the material to the printing head system.

The printing head system may include a device for extruding the material through an aperture of a predetermined shape and profile—the deposition nozzle, a mechanism for rotating the nozzle and curing module around the Z axis, and the light curing module, which is the source of ultraviolet light for curing the material.

Figure 8:
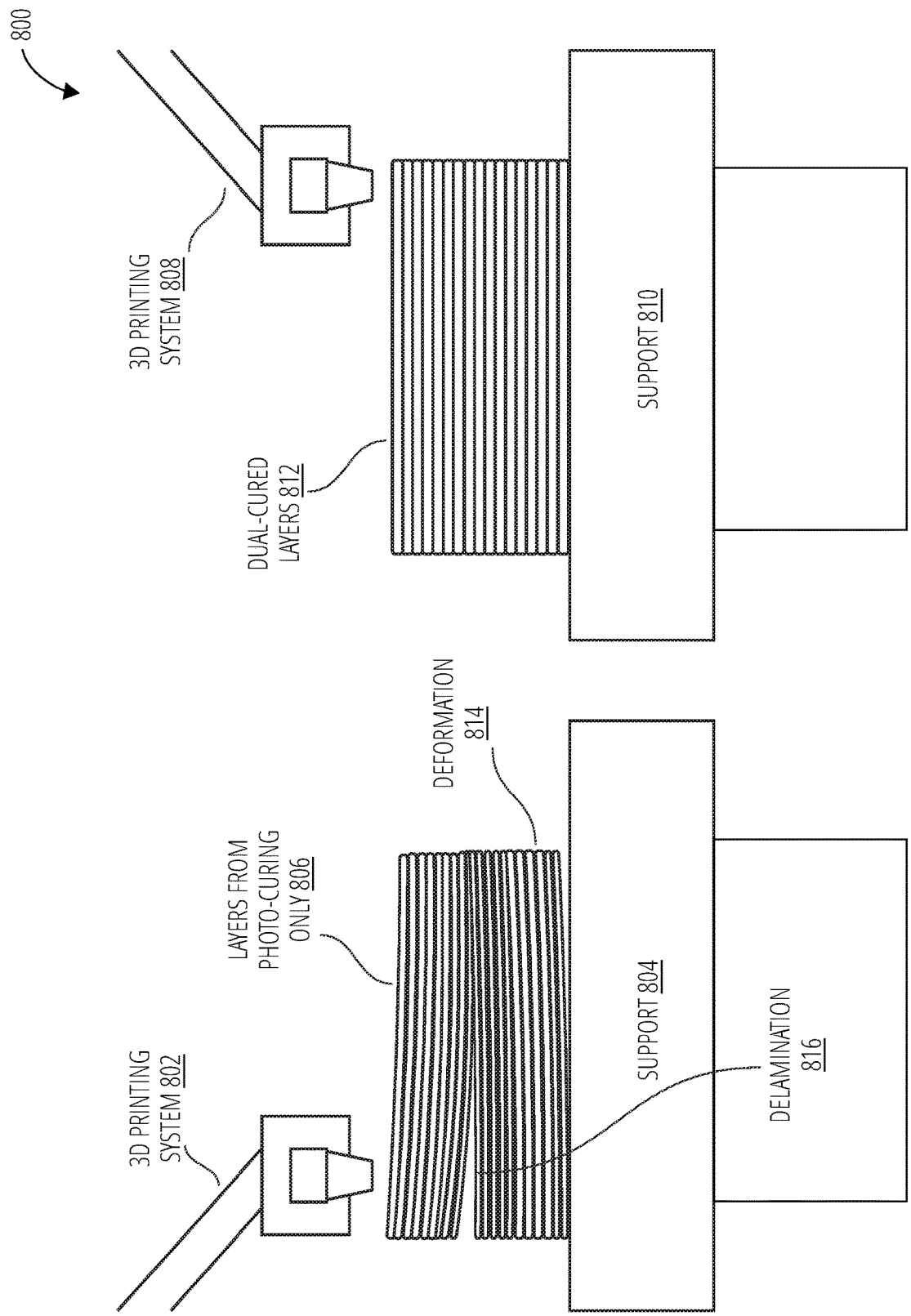
FIG. 8 illustrates a curing comparison 800 in accordance with one embodiment.

FIG. 8 illustrates a curing comparison 800 in accordance with one embodiment. A first 3D printing system 802 may extrude layers of photopolymer composite resin containing a photoinitiator onto a support 804. The 3D printing system 802 may include a light curing module that cures each layer substantially or completely through as it is deposited. The layers from photo-curing only 806 may exhibit distortions such as cracks, deformation 814, and delamination 816, related to the quick curing needed to completely cure the layer through, as shown.

In contrast, a 3D printing system 808 may deposit layers of photopolymer composite resin containing a photoinitiator, a thermal initiator, and a co-initiator onto a support 810. UV light from the 3D printing system 808 curing module may briefly cure an outer shell of the deposited resin in order to adhere the layers and create the layer structure. The remaining core of uncured resin may slowly cure from thermal energy generated as a byproduct of photo curing and/or from heat applied as part of a further curing process. The resulting dual-cured layers 812 are better able to maintain adherence and their desired shape once fully cured due to the dual-curing process. This is shown in further detail in FIG. 9.

Figure 9:
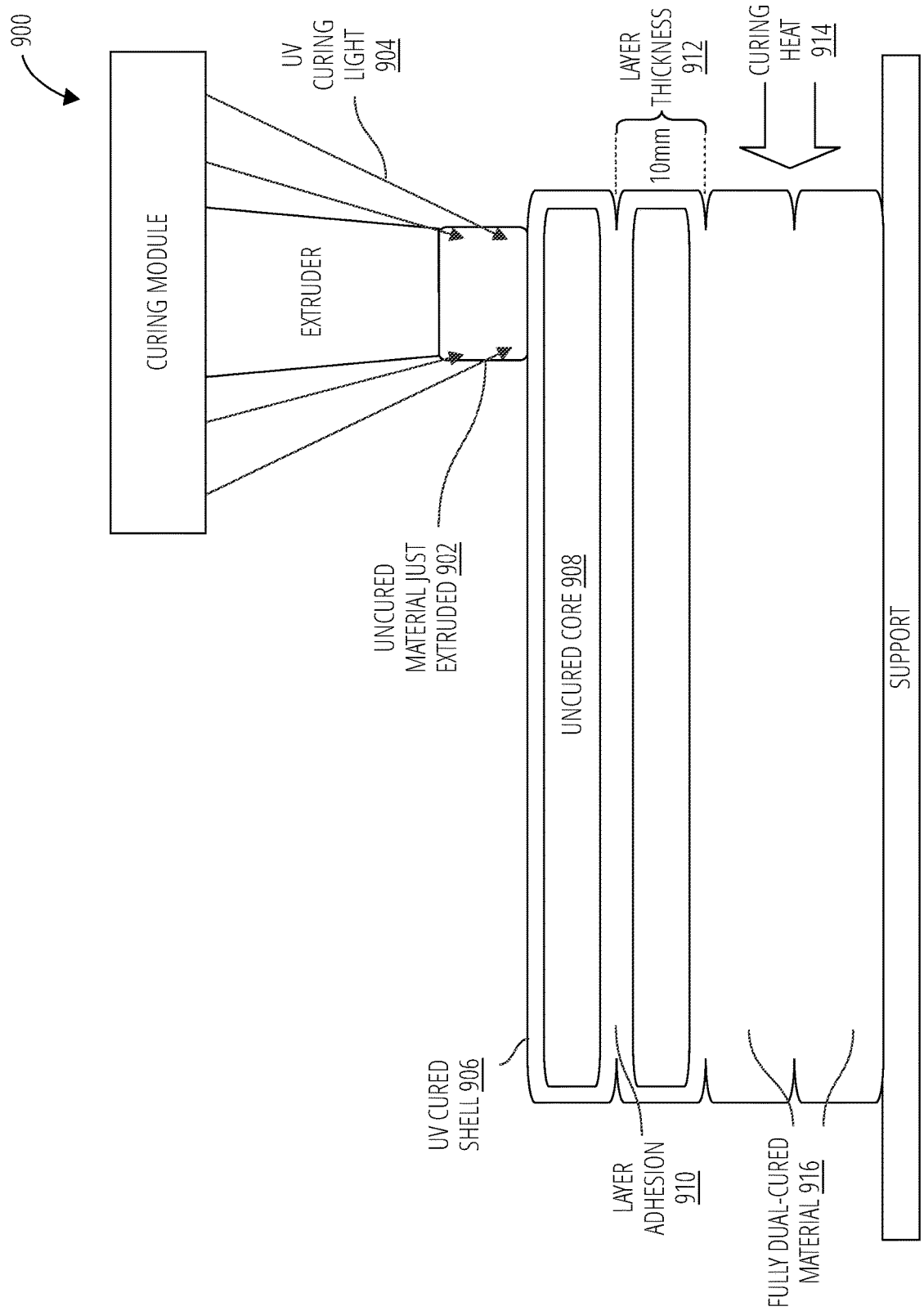
FIG. 9 illustrates a curing process detail 900 in accordance with one embodiment.

FIG. 9 illustrates a curing process detail 900 in accordance with one embodiment. The curing process detail 900 illustrates uncured material just extruded 902, UV curing light 904, UV cured shell 906, uncured core 908, layer adhesion 910, curing heat 914, and fully dual-cured material 916.

An extruder of a 3D printer may deposit uncured material just extruded 902 onto either a support, in the case of the first layer, or onto a previous layer. The curing module of the 3D printer may emit a UV curing light 904. This UV curing light 904 may be calibrated to work in conjunction with a UV initiator within the uncured material just extruded 902 in order to create a UV cured shell 906 from the outermost portion of the uncured material just extruded 902. The adhesion of the uncured material just extruded 902 with the UV cured shell 906 of the previously extruded layer may allow a strong layer adhesion 910 between each subsequent layer and the layer preceding it. The UV cured shell 906 may also allow each extruded layer to maintain its shape and structure, in spite of not being fully cured.

Within the UV cured shell 906 of each layer there may remain an uncured core 908. This uncured core 908 may be a result of the amount and wavelength of UV light emitted by the curing module. The uncured core may also result partially or in whole from the inclusion of additives within the resin matrix that scatter or block UV radiation, preventing the UV curing light 904 from penetrating beyond the outermost region of extruded material.

The uncured core 908 may be slowly cured by the action of a thermal initiator within the extruded material. Heat may be applied from an external source and/or may be a byproduct of the photo curing process. This heat may act with the thermal initiator to slowly complete the curing process, even when additives or layer thickness 912 prevent the deeper penetration of UV light. This dual-cure may result in tightly bonded and structurally sound layers of fully dual-cured material 916 with a greater layer thickness 912 (in some cases 10 mm or more) than is possible with UV curing alone.

Figure 10:
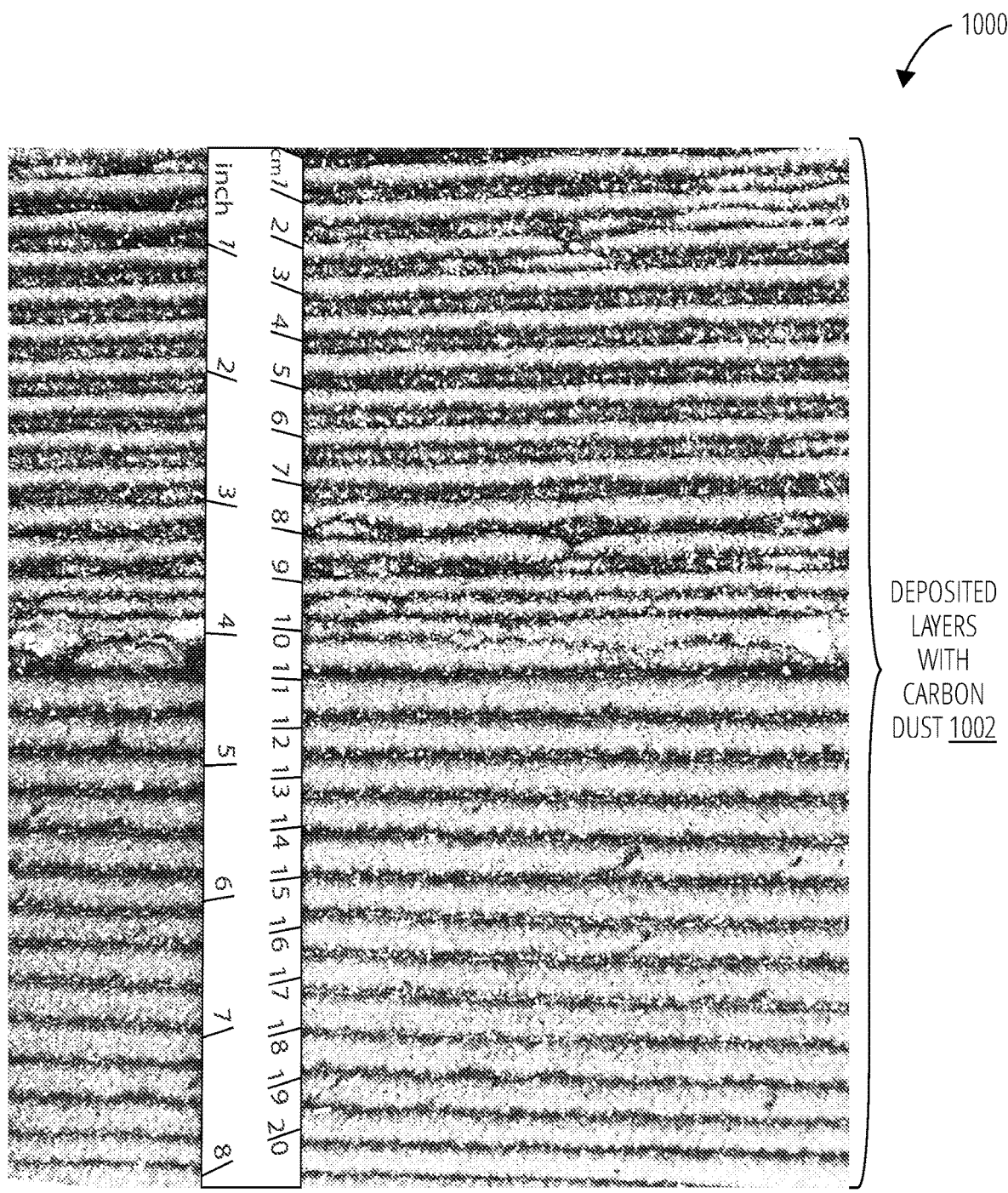
FIG. 10 illustrates layers with carbon dust 1000 in accordance with one embodiment.

FIG. 10 is a photograph of a 3D printed, dual-cured material including different thicknesses of layers with carbon dust 1000 in accordance with one embodiment. Utilizing a dual-curing photopolymer composite resin, carbon dust may be added and because the final curing stage relies on thermal energy (heat), which the carbon dust does not block, the final deposited layers with carbon dust 1002 may be even (if desired), tightly adhered, and capable of being built up to a considerable thickness, such as the almost 10 mm seen in the illustrated example.

In a configuration not utilizing a dual-curing process, the deposited layers with carbon dust 1002 may only photo cure through the interaction of UV light with a UV initiator within the photopolymer composite resin. The layers fail to cure completely and evenly, due to the way in which the carbon dust may block the scatter the UV light from the light curing module. The blocked and scattered light may be unable to penetrate deeply enough into the layer to provide a full cure.

Figure 11:
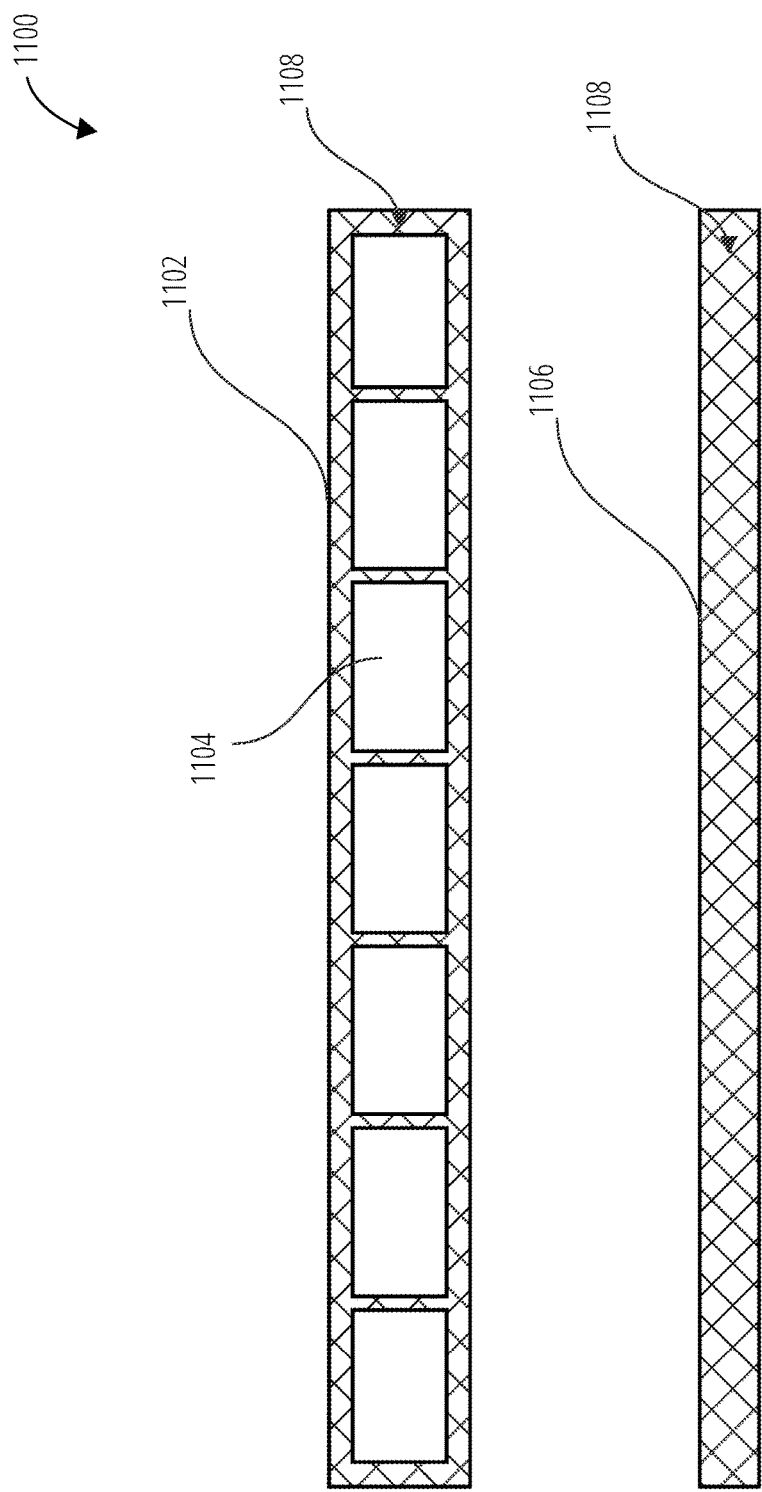
FIG. 11 illustrates cellular structure concepts 1100 in accordance with one embodiment.

FIG. 11 illustrates cellular structure concepts 1100 comprising a structural wall 1102, hollowed out portions 1104, and an in-fill pattern 1108, while the structural wall 1106 comprises just the in-fill pattern 1108. A wall structure with a special infill pattern may be utilized to increase material load bearing capacity without using additional reinforcement. The structural layers are printed using a cellular structure for better tensile strength and integrity. The 3D printing method utilizing dual-cure photopolymer composite materials disclosed herein, allows the building of structural elements with different geometries which are much better able to sustain loads compared to many materials commonly used in construction today.

EXAMPLES

The total structure of 3D printed parts may have some anisotropy of mechanical properties, because of layer-by-layer deposition. The effect of anisotropy may manifest itself in the percent difference in the properties of the printed parts along and across the deposited layers. However, a dual-curing system of initiators may reduce overall anisotropy of the printed parts. A comparative example showing the resulting products from the composition with and without the thermal initiator is shown in Table 10.

TABLE 10

Properties of 3D Printed Dual-Cured Composite in comparison with the Photopolymerized Composite

| Parameter | Dual-cured | | Photopolymerized | |
|---|---|---|---|---|
| | along | across | along | across |
| Ultimate compressive strength, MPa | 71±44 | 70 ± 7 | 58 ± 3 | 66 ± 5 |
| Yield strength, MPa | 60 ± 4 | 52 ± 5 | 47 ± 7 | 52 ± 4 |
| Compressive modulus of elasticity, MPa | 8400 ± 800 | 5400 ± 400 | 4100 ± 780 | 4600 ± 1300 |
| Relative compressive deformation, % | 2.0 ± 0.8 | 3.0 ± 1.0 | 4.3 ± 0.6 | 5.0 ± 1.0 |
| Ultimate tensile strength, MPa | 10.5 ± 0.7 | 7.0 ± 1.6 | 10 ± 1.0 | 5.5 ± 1.2 |
| Tensile modulus of elasticity, MPa | 11000 ± 1870 | 9400 ± 1700 | 5700 ± 680 | 5900 ± 1700 |
| Relative tensile deformation, % | 0.1 ± 0.02 | 0.08 ± 0.02 | 0.2 ± 0.02 | 0.1 ± 0.03 |

Photopolymerized Composite may be generated by blending the acrylate monomers, the UV initiator, and the fillers shown in Table 11 through operation of the blender for 20 minutes. Dual-Cure Composite may be generated by blending the acrylate monomers, the UV initiator, the thermal co-initiator, and the fillers shown in Table 11 through operation of the blender for 20 minutes. The thermal initiator may be added to the premix just before the composite is extruded.

TABLE 11

Components of Composites for 3D Printing System

| Components | Quantity Ranges: Dual-Cure | Quantity Ranges: Photopolymerization |
|---|---|---|
| Organic Matrix | 23 to 29 w % | 23 to 29 w % |
| Inorganic Hydrate | 22 to 24 w % | 22 to 24 w % |
| Functional Filler | 50 to 54 w % | 50 to 54 w % |
| UV Initiator | 0.07 to 0.00 w % | 0.07 to 0.09 w % |

TABLE 11-continued

Components of Composites for 3D Printing System

| Components | Quantity Ranges: Dual-Cure | Quantity Ranges: Photopolymerization |
|---|---|---|
| Thermal Initiator | 0.03 w % | 0 w % |
| Co-initiator | 0.02 w % | 0 w % |
| Dye/pigment | 0 w % | 0 w % |

Extrusion-based 3D printer equipped with a UV LED light source may be used for printing. The LED may be selected with the peak wavelength at 417 nm. The maximum light intensity of the UV LED light source on the top of the deposited layer may be 42 to 43 W/cm$^2$ with a diameter of spot size of about 20 mm. The nozzle passage speed of 40 mm/sec may be applied with the feeding rate of the composite into the nozzle (internal diameter of 10 mm) of $2\times10^3$ to $2.5\times10^3$ mm$^3$/sec, which may lead to the formation of the layer with a width of 16 mm and height of 4 mm. Photopolymerized material may be printed by applying 100% of the UV LED light source intensity. In case of dual-cure polymerization process, 3 to 6% of the maximum intensity of the light source may be used. The applied light irradiation may allow control of the initiation of the polymerization reaction at the surface. The chosen concentration of BAPO and light intensity may limit the penetration depth and allow the reaction to accumulate near the top surface of the deposited layer, thereby supporting the formation of the solid shell and avoiding deformation of the surface due to rapid solidification and volume shrinkage. As a result, the solid shell may form with the thickness of 0.5 to 1 mm, which may hold the shape of the layer.

Compared to the composite polymerized by applying the dual-curing system, the photopolymerized composite may exhibit lower mechanical performance. For the dual-cured composite, the difference of 33% may be observed for the ultimate tensile strength. The ultimate compressive strength values along and across the printed layers may be equal. The decrease in difference between the properties of the printed parts along and across the deposited layers may be caused by a reduction in anisotropy due to improved layer adhesion for the 3D printed parts. The photopolymerized composite may exhibit 14% distinction in the ultimate compressive strength values and 45% distinction in the ultimate tensile strength values. Higher stiffness of the dual-cured formulation may be due to enhancement of the conversion degree of the material within sequential photo-and thermal-polymerization curing.

The methods and formulations in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A method of 3D printing a photopolymer composite material, the method comprising:
accessing a 3D printing system comprising:
a control system,
a mixing system, including a mixing tank,
a feeding system in fluid communication with the mixing system,
a light curing module controlled by the control system, and
a printing head controlled by the control system, the printing head including:
an extruder in fluid communication with the feeding system, and
a nozzle in fluid communication with the extruder;
a) providing a resin premix material including:
at least one of an acrylate monomer and an acrylate oligomer in the range between about 10.0-30.0 w % of a photopolymer composite resin;
an inorganic hydrate in the range between about 5.0-30.0 w % of the photopolymer composite resin;
a reinforcing filler in the range between about 50.0-80.0 w % of the photopolymer composite resin;
an ultraviolet (UV) initiator in the range between about 0.001-0.2 w % of the photopolymer composite resin; and
a co-initiator in the range between about 0.001-0.05 w % of the photopolymer composite resin;
b) mixing in the mixing tank a thermal initiator in the range between about 0.001-0.05 w % of the photopolymer composite resin with the resin premix material to form the photopolymer composite resin, wherein the thermal initiator is supplied from the feeding system;
c) extruding a layer of the photopolymer composite resin using the nozzle onto a support, wherein the nozzle is instructed via the control system to extrude the layer of the photopolymer composite resin;
d) partially curing, via the light curing module, the layer using light irradiation;
e) repeating steps c) and d) onto each subsequent layer to create the photopolymer composite material; and
f) fully curing at least one of the partially cured layers by activation of the thermal initiator and use of thermal energy, wherein partial curing of the layer in step d) and activation of the thermal initiator by the co-initiator induces polymerization and a release of heat, which induces an autocatalytic polymerization reaction at and above an autocatalytic threshold temperature.

2. The method of claim 1, wherein the thermal initiator is added directly to extruder of the 3D printer where the thermal initiator is mixed with the resin premix material before the photopolymer composite resin is extruded.

3. The method of claim 1, wherein the thermal initiator is a powder and the thermal initiator is mixed with the resin premix material for about 30 seconds to 5 minutes.

4. The method of claim 1, wherein the thermal initiator is a liquid and the thermal initiator is mixed with the resin premix material for about 5 seconds to 60 seconds.

5. The method of claim 1, further comprising:
forming an acrylate prepolymer by:
blending a portion of the acrylate monomers or the acrylate oligomers with a portion of a UV initiator to form a prepolymer mixture; and
irradiating the prepolymer mixture with light to form the acrylate prepolymer, wherein the irradiating only partially polymerizes the prepolymer mixture; and
mixing the acrylate prepolymer into the resin premix.

6. The method of claim 1, further comprising replacing the resin premix material with a new resin premix material, wherein an amount of the inorganic hydrate in the new resin premix material is the amount effective to keep a layer temperature below the autocatalytic threshold temperature.

7. The method of claim 1, wherein each layer in steps c)-e) remains at a temperature that is below the autocatalytic threshold temperature.

8. The method of claim 1, wherein the co-initiator is bisomer PTE.

9. The method of claim 1, wherein the resin premix further comprises a dye or pigment in the range between about 0.001-0.05 w % of the photopolymer composite resin.

10. The method of claim 1, wherein the acrylate oligomer is Triethylene glycol dimethylacrylate (TEGDMA).

11. The method of claim 1, wherein the layer has a thickness in the range between about 1 mm and 10 mm, and the layer is extruded by a single pass of a printing head of the 3D printer.

12. The method of claim 1, wherein the reinforcing filler comprises at least aluminum oxide trihydrate or an aluminum oxide trihydrate mixture with at least one of calcium carbonate, talc, silica, wollastonite, calcium sulfate fibers, mica, glass beads, glass fibers, or a combination thereof.

13. The method of claim 1, wherein the UV initiator is bisacylphosphine oxides (BAPO)s.

14. The method of claim 1, wherein the thermal initiator is benzoyl peroxide.

15. The method claim 1, wherein the resin premix further includes a flame-retardant additive in the range between about 35.0 to 75.0 w % of the formulation, the flame-retardant additive including at least sodium tetraborate and boric acid.

16. The method of claim 1, wherein the thermal initiator is a powder and the thermal initiator is mixed with the resin premix material for about 30 seconds to 5 minutes before being received by the extruder.

17. The method of claim 1, wherein the thermal initiator is a liquid thermal initiator including the thermal initiator at least partially dissolved in acrylate monomer, and the resin premix material is combined with the liquid thermal initiator for about 5 seconds to 60 seconds before being received by the extruder.

18. The method of claim 1, wherein the control system instructs the feeding system to adjust at least one of the amount of the thermal initiator that is combined with the resin premix material, and a timing of the supplying of the thermal initiator to be combined with the resin premix material to form the photopolymer composite resin.

19. The method of claim 1, wherein the thermal initiator is added directly to the extruder where the thermal initiator is mixed with the resin premix material before the photopolymer composite resin delivered to the nozzle.

* * * * *